(12) United States Patent
Yoshimura et al.

(10) Patent No.: US 12,274,190 B2
(45) Date of Patent: Apr. 15, 2025

(54) WORKING MACHINE

(71) Applicant: KUBOTA CORPORATION, Osaka (JP)

(72) Inventors: Fumiya Yoshimura, Sakai (JP); Kotaro Yamaguchi, Sakai (JP); Kenji Tamatani, Sakai (JP); Takanori Morimoto, Sakai (JP); Ken Sakuta, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 328 days.

(21) Appl. No.: 17/837,251

(22) Filed: Jun. 10, 2022

(65) Prior Publication Data

US 2022/0304216 A1    Sep. 29, 2022

Related U.S. Application Data

(63) Continuation of application No. PCT/JP2020/046482, filed on Dec. 14, 2020.

(30) Foreign Application Priority Data

Dec. 18, 2019   (JP) ................ 2019-228667

(51) Int. Cl.
*A01B 69/00* (2006.01)
*A01B 63/10* (2006.01)
(Continued)

(52) U.S. Cl.
CPC ........ *A01B 69/008* (2013.01); *A01B 63/1006* (2013.01); *A01B 63/1117* (2013.01)

(58) Field of Classification Search
CPC . A01B 59/066; A01B 63/1117; A01B 69/008; A01B 59/043; A01B 63/1006
See application file for complete search history.

(56) References Cited

U.S. PATENT DOCUMENTS 4,515,221 A    5/1985   van der Lely
5,995,001 A *  11/1999  Wellman ............... B66F 17/003
                                                    340/685

(Continued)

FOREIGN PATENT DOCUMENTS

JP    08-331943 A    12/1996
JP    2008-278840 A  11/2008
(Continued)

OTHER PUBLICATIONS

Official Communication issued in corresponding Japanese Patent Application No. 2019-228667, mailed on May 9, 2023.

(Continued)

*Primary Examiner* — Stephen Holwerda
(74) *Attorney, Agent, or Firm* — Keating & Bennett, LLP

(57) ABSTRACT

A working machine includes a machine body, a lifting device to link a working device to the machine body, the lifting device being capable of moving up and down with the working device between a grounding state in which the working device is in contact with a ground and an ungrounding state in which the working device is out of contact with the ground, and an automatic travel controller to cause the machine body to perform automatic travel according to a planned travel route. The automatic travel controller includes a lifting controller to control the lifting device to move up with the working device from the grounding state to the ungrounding state, and cause the machine body to turn or travel rearward after the lifting controller controls the lifting device to move up with the working device from the grounding state to the ungrounding state.

7 Claims, 14 Drawing Sheets

(51) Int. Cl.
*A01B 63/111* (2006.01)
*A01B 69/04* (2006.01)

(56) References Cited

U.S. PATENT DOCUMENTS

| | | | | |
|---|---|---|---|---|
| 2006/0070773 | A1* | 4/2006 | Dahl | E02F 9/265 |
| | | | | 177/136 |
| 2014/0107884 | A1* | 4/2014 | Swenson | G05D 1/0278 |
| | | | | 701/25 |
| 2017/0168501 | A1* | 6/2017 | Ogura | G05D 1/6484 |
| 2017/0238456 | A1* | 8/2017 | Boulard | A01B 79/00 |
| 2018/0143734 | A1* | 5/2018 | Ochenas | B66F 17/003 |
| 2018/0206392 | A1* | 7/2018 | Matsuzaki | A01B 76/00 |
| 2018/0229988 | A1* | 8/2018 | Gault | B66F 17/003 |
| 2019/0264419 | A1* | 8/2019 | Myers | E02F 3/283 |
| 2019/0343032 | A1* | 11/2019 | Stanhope | A01B 76/00 |
| 2021/0337715 | A1* | 11/2021 | Fujimoto | G05D 1/223 |

FOREIGN PATENT DOCUMENTS

| | | |
|---|---|---|
| JP | 2014-236707 A | 12/2014 |
| JP | 2019-041771 A | 3/2019 |
| JP | 2019-054746 A | 4/2019 |
| JP | 2019-103422 A | 6/2019 |
| JP | 2019-115299 A | 7/2019 |
| JP | 2019-187358 A | 10/2019 |

OTHER PUBLICATIONS

Official Communication issued in International Patent Application No. PCT/JP2020/046482, mailed on Feb. 22, 2021.

* cited by examiner

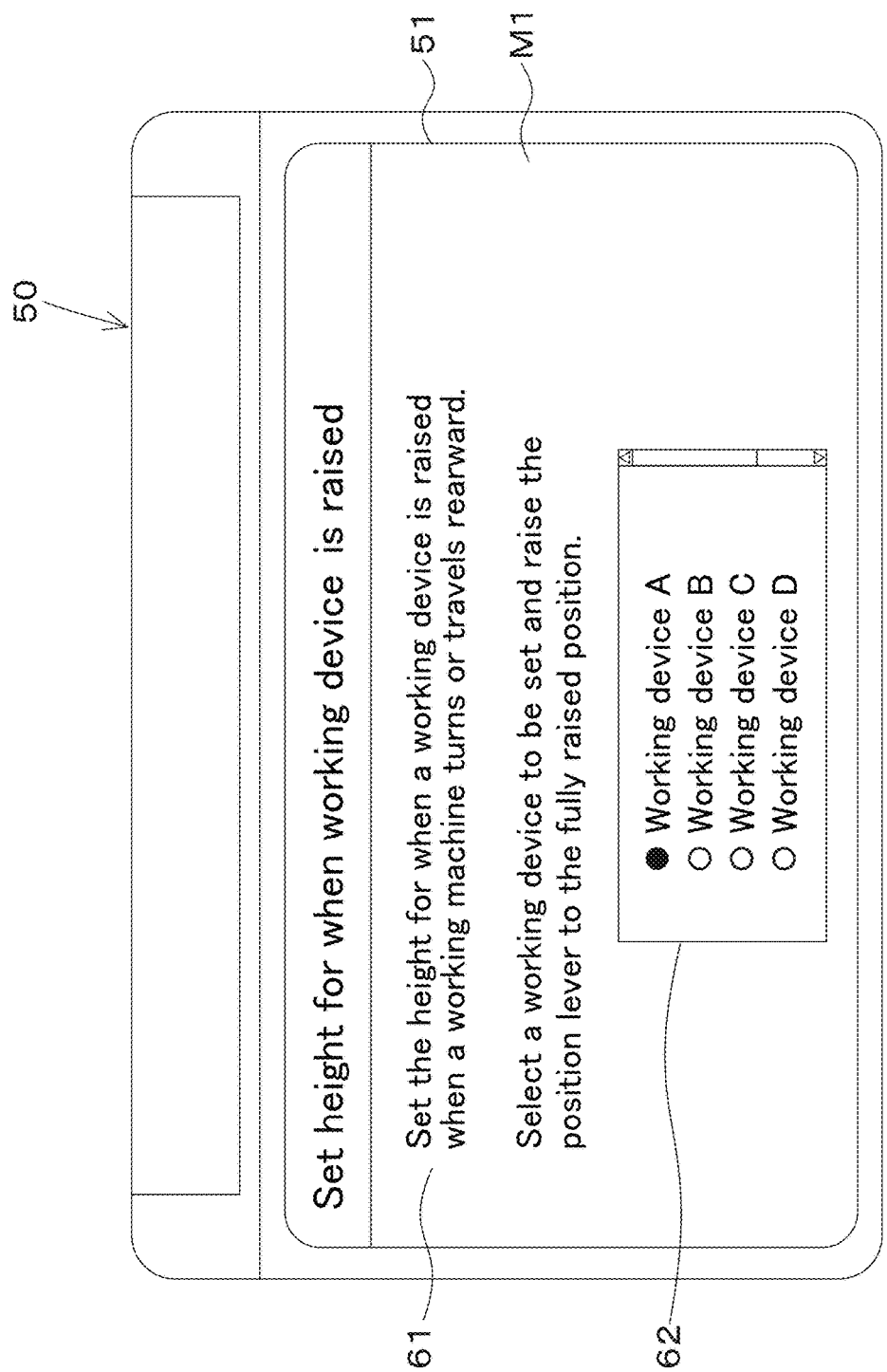

WORKING MACHINE

CROSS REFERENCE TO RELATED APPLICATIONS

This application is a continuation application of International Application No. PCT/JP2020/046482, filed on Dec. 14, 2020, which claims the benefit of priority to Japanese Patent Application No. 2019-228667, filed on Dec. 18, 2019. The entire contents of each of these applications are hereby incorporated herein by reference.

BACKGROUND OF THE INVENTION

1. Field of the Invention

The present invention relates to a working machine including a lifting device.

2. Description of the Related Art

A working machine disclosed in Japanese Unexamined Patent Application Publication No. 2019-54746 includes a machine body, a lifting device which links a working device to the machine body and which is capable of raising and lowering the working device, and a control device to cause the machine body to perform automatic travel according to a planned travel route, wherein the lifting device raises the working device manually or automatically when the machine body is to turn and lowers the working device manually or automatically when work is to be done.

SUMMARY OF INVENTION

With the working machine of Japanese Unexamined Patent Application Publication No. 2019-54746, the machine body is caused to perform automatic travel along the planned travel route, and the working device is raised when the machine body is to turn.

However, in order to unfailingly recognize or detect whether the working device is not in contact with the ground (ungrounding state) when the machine body is to turn, an operator needs to make a visual check every time the machine body is to turn or a sensor to detect contact with the ground or the like needs to be attached to the working device. Furthermore, in addition to when the machine body turns, if the working device is in contact with the ground when the machine body travels rearward, this would hinder the travel of the machine body and such rearward travel may impose a load on the working device.

Preferred embodiments of the present invention provide working machines each capable of reliably raising a working device to an ungrounding state when the working machine, which performs automatic travel, is to turn or travel rearward.

A working machine according to an aspect of a preferred embodiment of the present invention includes a machine body, a lifting device to link a working device to the machine body, the lifting device being capable of moving up and down with the working device between a grounding state in which the working device is in contact with a ground and an ungrounding state in which the working device is out of contact with the ground, and an automatic travel controller to cause the machine body to perform automatic travel according to a planned travel route, wherein the automatic travel controller is configured or programmed to include a lifting controller to control the lifting device to move up with the working device from the grounding state to the ungrounding state, and cause the machine body to turn or travel rearward after the lifting controller controls the lifting device to move up with the working device from the grounding state to the ungrounding state.

The working machine further includes an input interface to receive input of a height of the lifting device in the ungrounding state, wherein the lifting controller is configured or programmed to control, based on the height received by the input device, the lifting device to move up with the working device from the grounding state to the ungrounding state.

The input interface includes a display to display an input screen to receive input of the height, the display includes a storage to store information regarding the working device and the height received by the input screen such that the working device and the height are associated with each other, and the lifting controller is configured or programmed to acquire, from the storage, the height associated with the working device.

The working machine further includes a corrector to correct the height received by the input interface based on a predetermined correction value so that the height thus corrected is higher than the height received by the input interface, wherein the lifting controller is configured or programmed to control, based on the height corrected by the corrector, the lifting device to move up with the working device from the grounding state to the ungrounding state.

The working machine further includes a notifier to, in a case where the automatic travel controller causes the machine body to turn or travel rearward, provide a predetermined warning for a period of time during which the lifting controller controls the lifting device to move up with the working device from the grounding state to the ungrounding state.

The lifting controller is configured or programmed to control the lifting device to move down with the working device from the ungrounding state to the grounding state, and the automatic travel controller is configured or programmed to cause the machine body having turned to start traveling straight or causes the machine body having traveled rearward to start traveling forward after the lifting controller controls the lifting device to move down with the working device from the ungrounding state to the grounding state.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 5A illustrates an example of a guide screen displayed on a display unit.

DETAILED DESCRIPTION OF THE PREFERRED EMBODIMENTS

Figure 1:
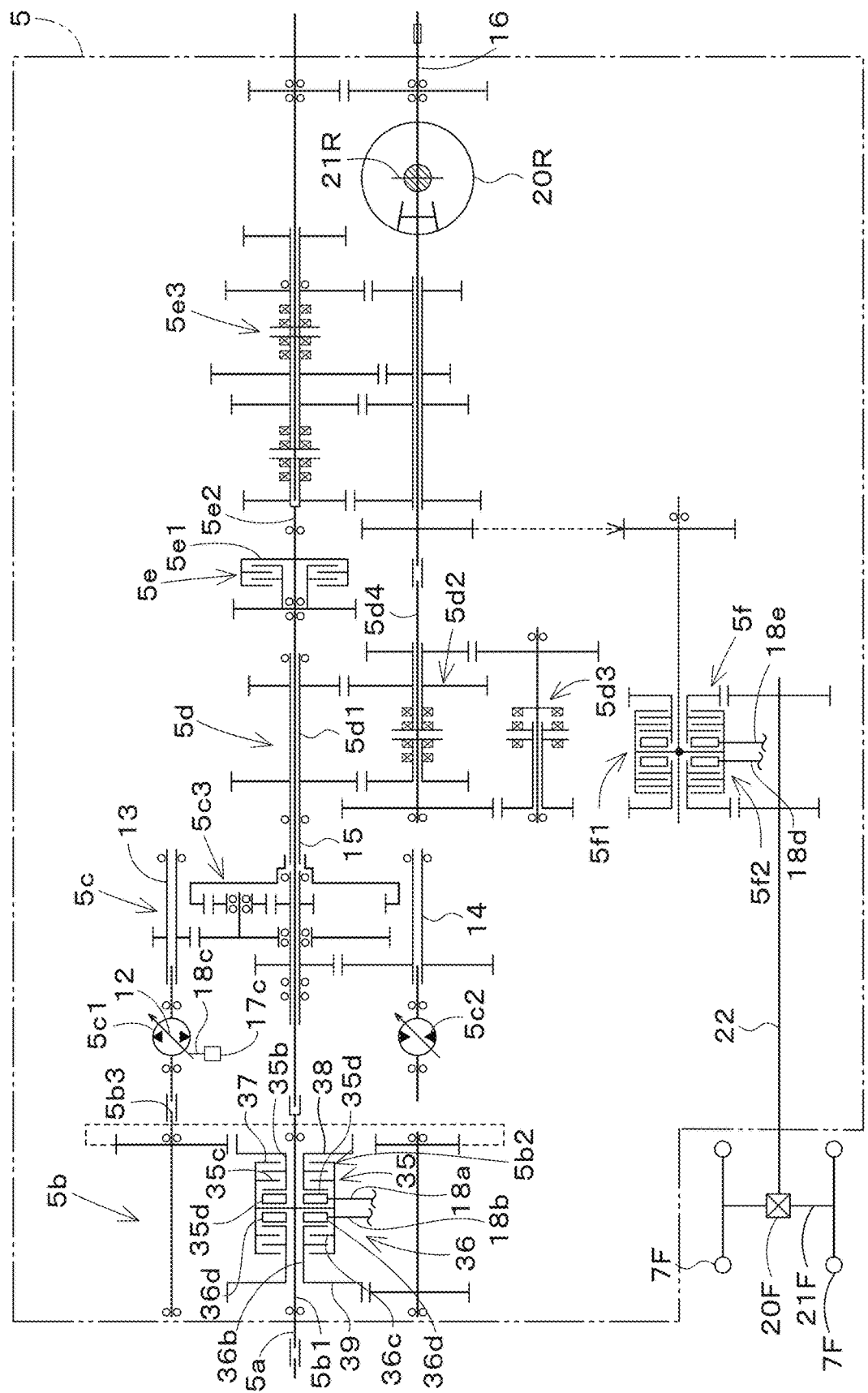
FIG. 1 is a block diagram of a transmission.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of the present invention with reference to drawings.

Figure 7:
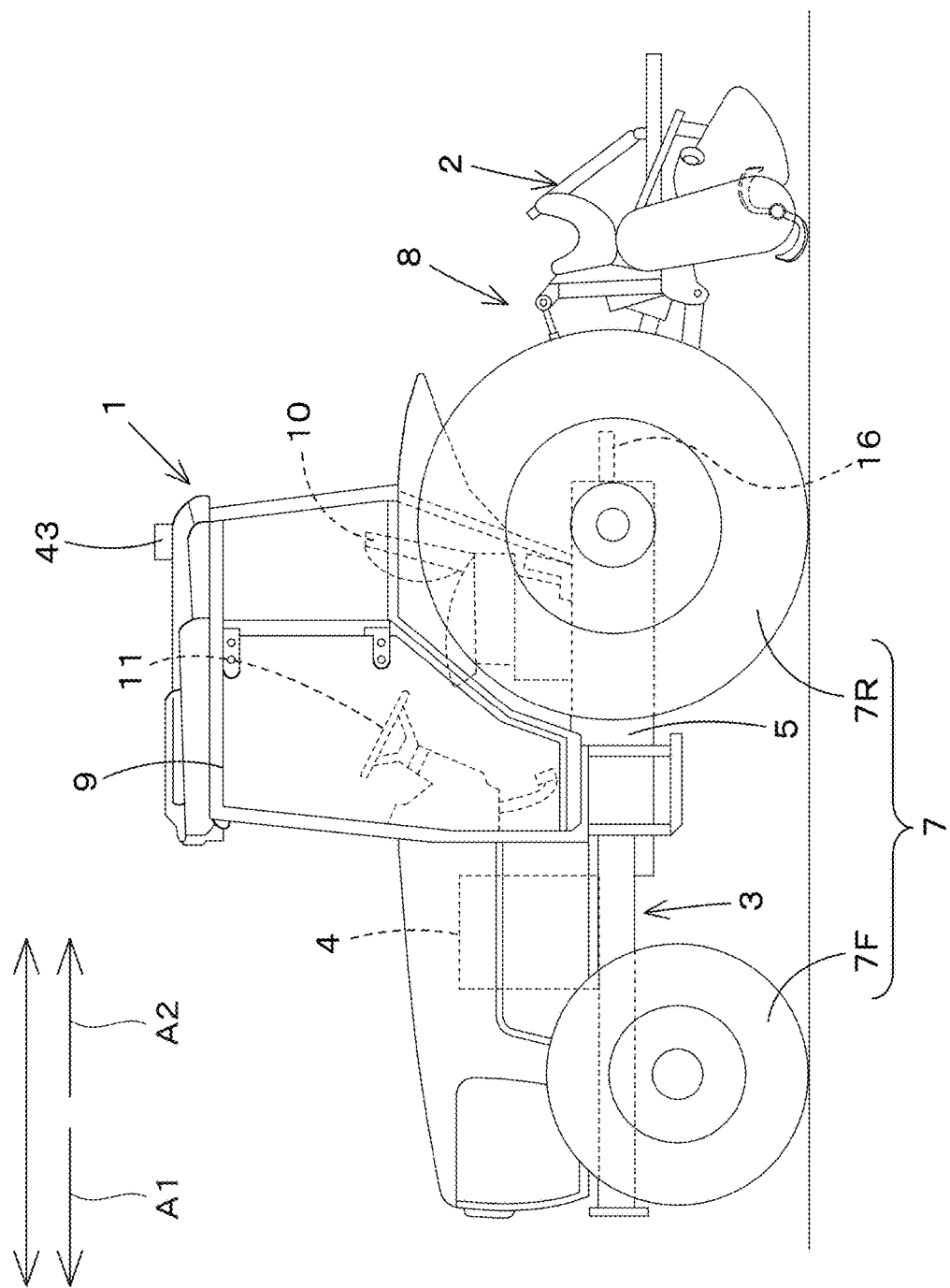
FIG. 7 is a general side view of the working machine.

FIG. 7 illustrates a tractor, which is an example of a working machine 1. The working machine 1 is discussed using a tractor as an example in the present preferred embodiment, but the working machine 1 is not limited to a tractor. In preferred embodiments of the present invention, descriptions are based on the assumption that the front of the working machine 1 as seen from an operator (driver) seated on an operator's seat 10 (indicated by arrow A1 in FIG. 7) is "front", the rear of the working machine 1 as seen from the operator (indicated by arrow A2 in FIG. 7) is "rear", the left side of the working machine 1 as seen from the operator is "left" (near side in FIG. 7), and the right side of the working machine 1 as seen from the operator is "right" (far side in FIG. 7). The descriptions are also based on the assumption that a horizontal direction orthogonal to a front-rear direction of the working machine 1 is a width direction.

As illustrated in FIG. 7, the working machine 1 includes a travel vehicle (machine body) 3 which includes a traveling device 7 and which is capable of traveling, a prime mover 4, a transmission 5, and a steering unit 11. The traveling device 7 includes front wheel(s) 7F and rear wheel(s) 7R. The front wheels 7F may be tire-shaped wheels and may be crawler-shaped wheels. The rear wheels 7R also may be tire-shaped wheels and may be crawler-shaped wheels. The prime mover 4 is an internal combustion engine such as a gasoline engine or a diesel engine, an electric motor, and/or the like. In the present preferred embodiment, the prime mover 4 is a diesel engine.

The transmission 5 is capable of changing driving forces for the traveling device 7 by changing speed stages and switching the traveling state of the traveling device 7 between forward and rearward traveling states. The machine body 3 is provided with a cabin 9, and the cabin 9 is provided with the operator's seat 10 therein.

As illustrated in FIG. 7, the machine body 3 is provided with a lifting device 8 at the rear thereof. The lifting device 8 can have a working device 2 attached thereto. The lifting device 8 is capable of raising and lowering the working device 2 attached thereto. The working device 2 is a cultivator (rotary cultivator) for cultivation as illustrated in FIG. 7, a fertilizer spreader for spreading fertilizer, an agricultural chemical spreader for spreading agricultural chemicals, a harvester for harvesting, a mower for mowing grass or the like, a tedder for tedding grass or the like, a rake for raking grass or the like, a baler for baling grass or the like, or the like.

As illustrated in FIG. 1, the transmission 5 includes a main shaft (propeller shaft) 5a, a shuttle unit 5b, a main transmission unit 5c, an auxiliary transmission unit 5d, a PTO power transmission unit 5e, and a front transmission unit 5f. The propeller shaft 5a is rotatably supported on a housing of the transmission 5, and power from a crankshaft of the prime mover 4 is transmitted to the propeller shaft 5a.

As illustrated in FIG. 1, the shuttle unit 5b includes a shuttle shaft 5b1 and a forward/reverse switching unit 5b2. The shuttle shaft 5b1 receives power transmitted from the propeller shaft 5a. The forward/reverse switching unit 5b2 includes, for example, a hydraulic clutch and/or the like, and changes the direction of rotation of the shuttle shaft 5b1, i.e., switches the traveling state of the working machine 1 between forward and reverse traveling states, by selectively engaging or disengaging the hydraulic clutch. Specifically, the forward/reverse switching unit 5b2 includes a forward clutch unit 35 and a reverse clutch unit 36. The forward clutch unit 35 and the reverse clutch unit 36 have a housing 37 which rotates together with the propeller shaft 5a.

As illustrated in FIG. 1, the forward clutch unit 35 includes a cylindrical shaft 35b, friction plates 35c disposed between the housing 37 and the cylindrical shaft 35b, and a pressure member 35d. The pressure member 35d is biased in a direction away from the friction plates 35c by a biasing member such as a spring or the like (not illustrated).

Figure 2:
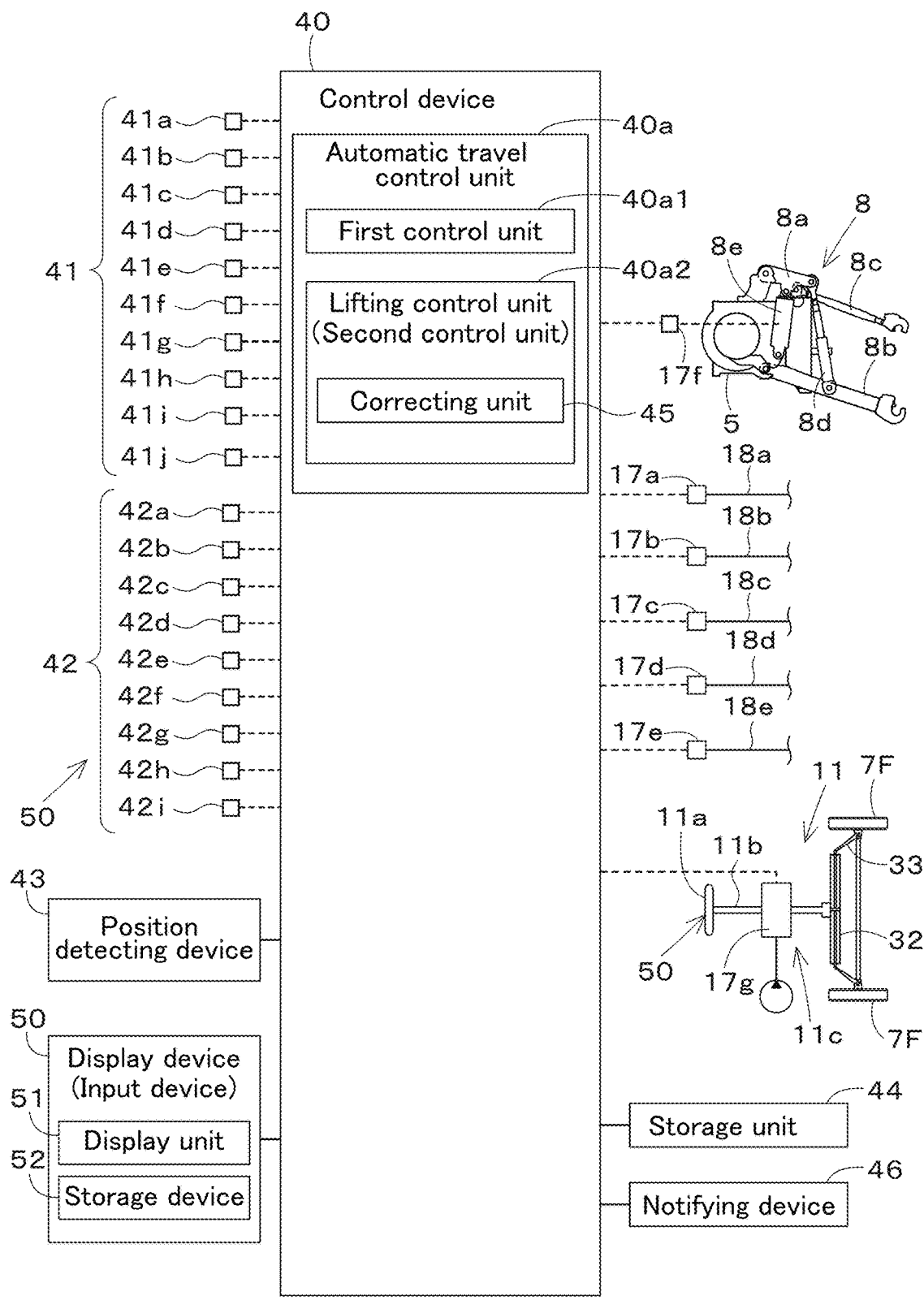
FIG. 2 illustrates a control block of a working machine.

As illustrated in FIG. 1, the portion of the interior of the housing 37 where the forward clutch unit 35 is located is connected with a first fluid passage 18a through which hydraulic fluid is supplied and discharged. As illustrated in FIG. 2, the first fluid passage 18a is connected to a first control valve 17a. Once the degree of opening of the first control valve 17a has been changed and hydraulic fluid has been supplied from the first fluid passage 18a toward the housing 37, the pressure member 35d moves to the pressing side (engagement side) against the biasing force of the spring to press the friction plates 35c against the housing 37, bringing the forward clutch unit 35 into an engaged state. Power from the propeller shaft 5a is transmitted to a gear 38 which rotates together with the cylindrical shaft 35b. On the contrary, once hydraulic fluid has been discharged from the housing 37 to the first fluid passage 18a, the pressure member 35d moves to the disengagement side under the biasing force of the spring to allow the friction plates 35c to move away from the housing 37, bringing the forward clutch unit 35 into a disengaged state. Power from the propeller shaft 5a is not transmitted to the gear 38. The gear (output gear) 38 at the output side of the forward clutch unit 35 meshes with an output shaft 5b3. When the forward clutch unit 35 is in the engaged state, a driving force is transmitted to the output shaft 5b3.

As illustrated in FIG. 1, the reverse clutch unit 36 includes a cylindrical shaft 36b, friction plates 36c disposed between the housing 37 and the cylindrical shaft 36b, and a pressure member 36d. The pressure member 36d is biased in a direction away from the friction plates 36c by a biasing member such as a spring or the like (not illustrated).

As illustrated in FIG. 1, the portion of the interior of the housing 37 where the reverse clutch unit 36 is located is connected with a second fluid passage 18b through which hydraulic fluid is supplied and discharged. As illustrated in FIG. 2, the second fluid passage 18b is connected to a second control valve 17b. Once the degree of opening of the second control valve 17b has been changed and hydraulic fluid has been supplied from the second fluid passage 18b toward the housing 37, the pressure member 36d moves to the pressing side (engagement side) against the biasing force of the spring to press the friction plates 36c against the housing 37, bringing the reverse clutch unit 36 into an engaged state. Power from the propeller shaft 5a is transmitted to a gear 39 which rotates together with the cylindrical shaft 36b. On the contrary, once hydraulic fluid has been discharged from the housing 37 to the second fluid passage 18b, the pressure member 36d moves to the disengagement side by the biasing force of the spring to allow the friction plates 36c to move away from the housing 37, bringing the reverse clutch unit 36 into a disengaged state. Power from the propeller shaft 5a is not transmitted to the gear 39. The gear (output gear) 39 at the output side of the reverse clutch unit 36 meshes with the output shaft 5b3. When the reverse clutch unit 36 is in the engaged state, driving force is transmitted to the output shaft 5b3.

The main transmission unit 5c is a continuously variable transmission mechanism which steplessly speed-changes power inputted thereto. As illustrated in FIG. 1, the continuously variable transmission mechanism includes a hydraulic pump 5c1, a hydraulic motor 5c2, and a planetary gear mechanism 5c3. The hydraulic pump 5c1 is rotated by power from the output shaft 5b3 of the shuttle unit 5b. The hydraulic pump 5c1 is, for example, a variable displacement pump including a swash plate 12, and the flow rate of hydraulic fluid discharged from the hydraulic pump 5c1 can be changed by changing the angle of the swash plate 12 (swash plate angle). The hydraulic motor 5c2 is a motor which is rotated by hydraulic fluid discharged from the hydraulic pump 5c1 via a fluid passage such as a pipe. The rotation speed of the hydraulic motor 5c2 can be changed by changing the swash plate angle of the hydraulic pump 5c1 and/or power inputted into the hydraulic pump 5c1.

As illustrated in FIG. 1, the planetary gear mechanism 5c3 includes a plurality of gears and power transmission shafts such as input and output shafts, and includes an input shaft 13 to receive power from the hydraulic pump 5c1, an input shaft 14 to receive power from the hydraulic motor 5c2, and an output shaft 15 to output power. The planetary gear mechanism 5c3 combines the power from the hydraulic pump 5c1 and the power from the hydraulic motor 5c2 and transmits the combined power to the output shaft 15.

Thus, with the main transmission unit 5c, power outputted to the auxiliary transmission unit 5d can be changed by changing the angle of the swash plate 12 of the hydraulic pump 5c1, the rotation speed of the prime mover 4, and/or the like.

In the present preferred embodiment, the angle of the swash plate 12 can be changed using hydraulic fluid supplied from a third control valve 17c. The swash plate 12 and the third control valve 17c are connected by, for example, a third fluid passage 18c through which hydraulic fluid is supplied and discharged. The third control valve 17c is a two-way switching valve with a solenoid valve. Hydraulic fluid flowing through the third fluid passage 18c can be adjusted by energizing or deenergizing the solenoid of the solenoid valve, and the angle of the swash plate 12 can be adjusted, that is, power outputted to the auxiliary transmission unit 5d can be changed. Note that, although the main transmission unit 5c is a continuously variable transmission mechanism, the main transmission unit 5c may be a multi-step transmission mechanism which changes speed stages using gears.

The auxiliary transmission unit 5d is a transmission mechanism which includes a plurality of multispeed gears and which speed-changes power. The auxiliary transmission unit 5d speed-changes the power inputted thereto from the output shaft 15 of the planetary gear mechanism 5c3 and outputs the speed-changed power, by appropriately changing the connection (meshing) of the plurality of gears. As illustrated in FIG. 1, the auxiliary transmission unit 5d includes an input shaft 5d1, a first speed change clutch 5d2, a second speed change clutch 5d3, and an output shaft 5d4. The input shaft 5d1 is a shaft to receive power from the output shaft 15 of the planetary gear mechanism 5c3, and inputs the received power into the first speed change clutch 5d2 and the second speed change clutch 5d3 via gear(s) and/or the like. The received power is changed by switching engaged and disengaged states of each of the first and second speed change clutches 5d2 and 5d3, and is outputted to the output shaft 5d4. The power outputted to the output shaft 5d4 is transmitted to a rear wheel differential 20R. The rear wheel differential 20R rotatably supports a rear axle 21R on which the rear wheels 7R are attached.

As illustrated in FIG. 1, the PTO power transmission unit 5e includes a PTO clutch 5e1, a PTO propeller shaft 5e2, and a PTO speed change unit 5e3. The PTO clutch 5e1 includes, for example, a hydraulic clutch and/or the like, and switching between the following states is achieved by engaging or disengaging the hydraulic clutch: a state in which power from the propeller shaft 5a is transmitted to the PTO propeller shaft 5e2; and a state in which power from the propeller shaft 5a is not transmitted to the PTO propeller shaft 5e2. The PTO speed change unit 5e3 includes speed change clutch(es) and a plurality of gears and/or the like, and changes power (rotation speed) inputted from the PTO propeller shaft 5e2 into the PTO speed change unit 5e3 and outputs the changed power. Power from the PTO speed change unit 5e3 is transmitted to a PTO shaft 16 via gear(s) and/or the like.

As illustrated in FIG. 1, the front transmission unit 5f includes a first front speed change clutch 5f1 and a second front speed change clutch 5f2. The first front speed change clutch 5f1 and the second front speed change clutch 5f2 can receive power transmitted from the auxiliary transmission unit 5d, and, for example, receive power from the output shaft 5d4 via gear(s) and transmission shaft(s). Power from the first front speed change clutch 5f1 and the second front speed change clutch 5f2 can be transmitted to a front axle 21F via a front transmission shaft 22. Specifically, the front transmission shaft 22 is connected to a front wheel differential 20F, and the front wheel differential 20F rotatably supports the front axle 21F on which the front wheels 7F are attached.

As illustrated in FIG. 1, the first front speed change clutch 5f1 and the second front speed change clutch 5f2 each include a hydraulic clutch and/or the like. The first front speed change clutch 5f1 is connected with a fourth fluid passage 18d and, as illustrated in FIG. 2, the fluid passage is connected to a fourth control valve 17d to which hydraulic fluid discharged from a hydraulic pump is supplied. The first front speed change clutch 5f1 is selectively brought into an engaged state or a disengaged state depending on the degree of opening of the fourth control valve 17d. As illustrated in FIG. 1, the second front speed change clutch 5f2 is connected with a fifth fluid passage 18e, and, as illustrated in FIG. 2, the fifth fluid passage 18e is connected to a fifth control valve 17e. The second front speed change clutch 5f2 is selectively brought into an engaged state or a disengaged state depending on the degree of opening of the fifth control valve 17e. The fourth control valve 17d and the fifth control valve 17e are each, for example, a two-way switching valve with a solenoid valve, and is selectively brought into a connected state or a disconnected state by energizing or deenergizing the solenoid of the solenoid valve.

When the first front speed change clutch 5f1 is in the disengaged state and the second front speed change clutch 5f2 is in the engaged state, power from the auxiliary transmission unit 5d is transmitted to the front wheels 7F via the second front speed change clutch 5f2. With this, four-wheel drive (4WD) in which the front wheels 7F and the rear wheels 7R are driven by power is achieved and the rotation speed is substantially the same between the front wheels 7F and the rear wheels 7R (4WD constant speed state, constant speed drive). On the contrary, when the first front speed change clutch 5f1 is in the engaged state and the second front speed change clutch 5f2 is in the disengaged state, four-wheel drive is achieved and the rotation speed of the front wheels 7F is greater than the rotation speed of the rear wheels 7R (4WD speedup state, speedup drive). Furthermore, when the first front speed change clutch 5f1 and the second front speed change clutch 5f2 are in the disengaged state, power from the auxiliary transmission unit 5d is not transmitted to the front wheels 7F, and therefore two-wheel drive (2WD) in which the rear wheels 7R are driven by power results. Note that the transmission 5 need only be capable of, for example, switching the traveling state of the traveling device 7 between forward and rearward traveling states, and the configuration thereof is not limited to that described above.

Figure 3A:
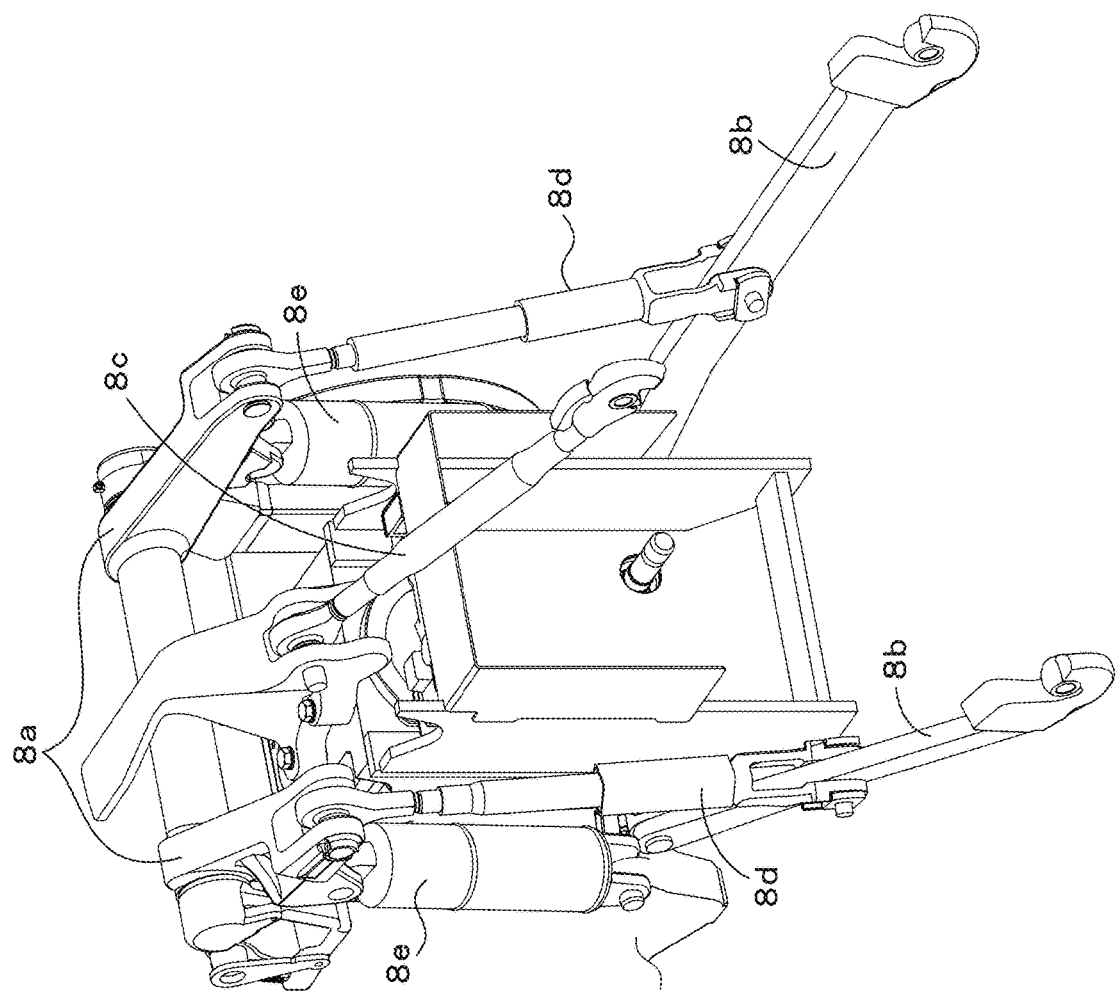
FIG. 3A is a perspective view of a lifting device.
Figure 3B:
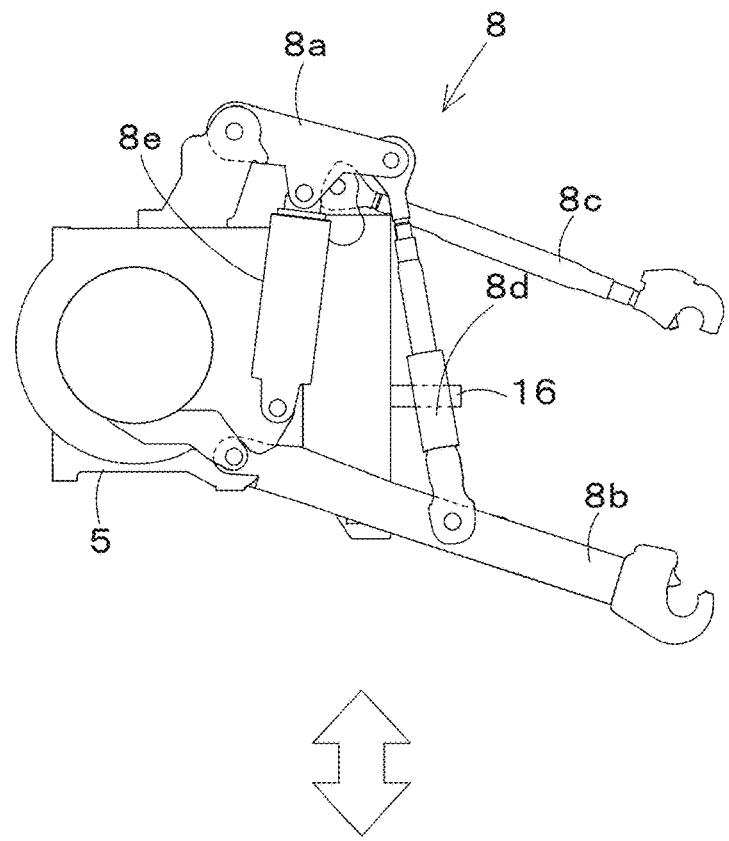
FIG. 3B is a perspective view of how the lifting device performs raising and lowering.
Figure 3B:
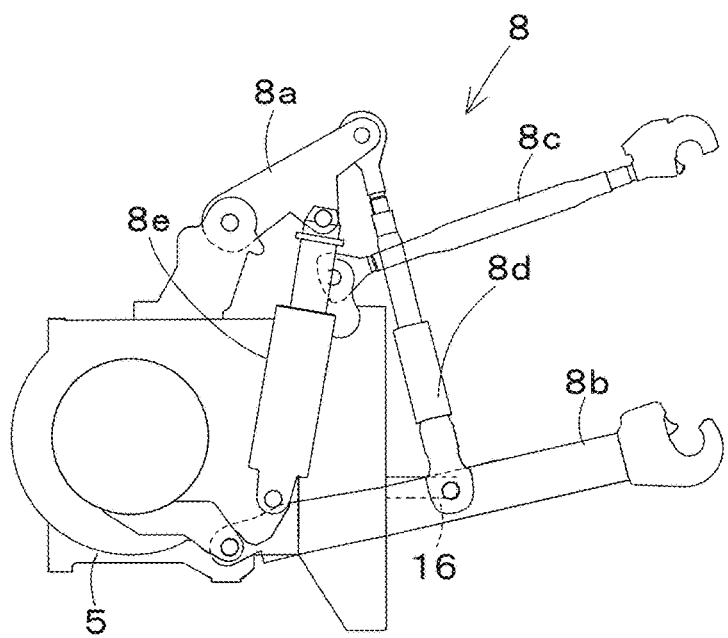

As illustrated in FIGS. 2, 3A, and 3B, the lifting device 8 includes lift arms 8a, lower links 8b, a top link 8c, lift rods 8d, and lift cylinders 8e. A front end of each lift arm 8a is supported on an upper rear portion of a case (transmission case) housing the transmission 5 such that the lift arm 8a is swingable up and down. The lift arm 8a is driven by a corresponding lift cylinder 8e to swing (raised or lowered). The lift cylinder 8e is a hydraulic cylinder. The lift cylinder 8e is connected to a hydraulic pump via a sixth control valve 17f. The sixth control valve 17f is a solenoid valve or the like to cause the lift cylinder 8e to extend and retract.

As illustrated in FIGS. 2, 3A, and 3B, a front end of each lower link 8b is supported on a lower rear portion of the transmission 5 such that the lower link 8b is swingable up and down. A front end of the top link 8c is supported, at a position higher than the lower link 8b, on a rear portion of the transmission 5 such that the top link 8c is swingable up and down. Each lift rod 8d connects a corresponding lift arm 8a and a corresponding lower link 8b. The working device 2 is linked to rear portions of the lower links 8b and the top link 8c. When the lift cylinders 8e are driven (extend or retract), the lift arms 8a ascend or descend, and the lower links 8b connected to the lift arms 8a via the lift rods 8d also ascend or descend. With this, the working device 2 swings up or down (raised or lowered) about front portions of the lower links 8b. Thus, the lifting device 8 is capable of moving down to a grounding state in which the working device 2 is in contact with the ground such as that of an agricultural field and moving up to an ungrounding state in which the working device 2 is out of contact with the ground.

As illustrated in FIG. 2, the steering unit (steering mechanism) 11 is capable of changing the orientation of the machine body 3 by changing the steering angle of the traveling device 7. The steering unit 11 includes a steering wheel 11a, a rotation shaft (steering shaft) 11b which rotates as the steering wheel 11a rotates, and an assist mechanism (power steering mechanism) 11c to assist the steering wheel 11a in steering. The steering wheel 11a is a member by which the machine body 3 is steered, and the steering wheel 11a is manually operated by an operator. The assist mechanism 11c includes a seventh control valve 17g and a steering cylinder 32. The seventh control valve 17g is, for example, a three-way switching valve which achieves multi-position switching by movement of a spool or the like. The switching of the seventh control valve 17g may also be achieved by operating the rotation shaft 11b. The steering cylinder 32 is connected to arms (knuckle arms) 33 for changing the orientation of the front wheels 7F. Therefore, upon operation of the steering wheel 11a, the position and the degree of opening of the seventh control valve 17g change according to the steering wheel 11a, and the steering cylinder 32 extends or retracts leftward or rightward according to the position and the degree of opening of the seventh control valve 17g, making it possible to change the steering direction of the front wheels 7F. Note that the foregoing steering unit 11 is an example, and the foregoing configuration does not imply any limitation.

As illustrated in FIG. 2, the working machine 1 includes a display device 50. The display device 50 includes a display unit 51 including a liquid crystal panel, a touchscreen, or some other panel, and a storage device 52. The display unit 51 is capable of displaying not only information to assist the working machine 1 in traveling but also various types of information regarding the working machine 1. The storage device 52 is a nonvolatile memory and/or the like, and stores, for example, information to be displayed on the display unit 51. Furthermore, the display device 50 is connected to apparatus(es) of the working machine 1 communicably in a wired or wireless manner.

As illustrated in FIG. 2, the working machine 1 includes a control device 40 and a storage unit 44. The control device 40 is configured or programmed to perform various types of control regarding the working machine 1. The control device 40 has connected thereto a plurality of detecting devices 41. The plurality of detecting devices 41 are devices to detect states of the working machine 1, and are, for example, a water temperature sensor 41a to detect water temperature, a fuel sensor 41b to detect the remaining amount of fuel, a prime mover rotation sensor (rotation sensor) 41c to detect the rotation speed of the prime mover 4, an accelerator pedal sensor 41d to detect the operation amount of an accelerator pedal 42f, a steering angle sensor 41e to detect the angle of steering by the steering unit 11, an extension sensor 41f to detect the extension (stroke) of the lift cylinders 8e, a tilt detecting sensor 41g to detect the tilting of the machine body 3 in a width direction (rightward or leftward), a vehicle speed sensor 41h to detect the speed of the machine body 3, a PTO rotation sensor (rotation sensor) 41i to detect the rotation speed of the PTO shaft 16, a battery sensor 41j to detect the voltage of a storage battery such as a battery, and/or the like. Note that the vehicle speed sensor 41h detects the speed of the machine body 3 based on, for example, the rotation speed of the front axle 21F and/or the rotation speed of the rear axle 21R. Furthermore, the vehicle speed sensor 41h is capable of also detecting the direction of rotation of the front axle 21F, the rear axle 21R, the front wheels 7F, or the rear wheels 7R, and is capable of also detecting whether the working machine 1 (machine body 3)

is traveling forward or rearward. The detecting devices 41 described above are examples, and not limited to the sensors described above.

Furthermore, the control device 40 has connected thereto a plurality of operation members 42. The plurality of operation members 42 may include a forward/reverse switching lever (shuttle lever) 42*a* by which the traveling state of the machine body 3 is switched between forward and reverse traveling states, an ignition switch 42*b* by which, for example, the prime mover 4 is started, a PTO speed change lever 42*c* by which the rotation speed of the PTO shaft 16 is set, a transmission changeover switch 42*d* by which either automatic transmission or manual transmission is selected, a speed change lever 42*e* by which the speed stage (speed level) of the transmission 5 is changed manually, an accelerator pedal 42*f* by which vehicle speed is increased or reduced, a position lever 42*g* by which the upward and downward movements of the lifting device 8 are controlled, an upper limit setting dial 42*h* by which the upper limit for the lifting device 8 is set, a vehicle speed lever 42*i* by which vehicle speed is set, and/or the like. Note that the operation members 42 described above are examples, and the operation members 42 described above do not imply any limitation.

The storage unit 44 is a nonvolatile memory and/or the like, and stores, for example, program(s) regarding control by the control device 40.

The following description discusses a case in which the control device 40 controls the raising and lowering performed by the lifting device 8 based on the operation of the position lever 42*g* and the upper limit setting dial 42*h*. For example, the control device 40 causes the working device 2 to be raised or lowered based on a detection signal outputted from the extension sensor 41*f*, an operation signal outputted from the position lever 42*g*, and an operation signal outputted from the upper limit setting dial 42*h*. The control device 40 calculates (acquires) the actual amount of extension (actual extension amount) of the lift cylinders 8*e* based on the detection signal outputted form the extension sensor 41*f* and a prescribed table stored in the storage unit 44. The control device 40 calculates (acquires) the amount of extension of the lift cylinders 8*e* based on the operation of the position lever 42*g* (such an amount of extension is "indicated extension amount") based on the operation signal outputted from the position lever 42*g* and a prescribed table stored in the storage unit 44. Furthermore, the control device 40 calculates (acquires) the upper limit of the amount of extension of the lift cylinders 8*e* based on the operation of the upper limit setting dial 42*h*, in other words, the control device 40 calculates (acquires) the upper limit of the height of the lifting device 8, based on the operation signal outputted from the upper limit setting dial 42*h* and a prescribed table stored in the storage unit 44.

In the case where the indicated extension amount is less than the upper limit and the actual extension amount is less than the indicated extension amount or in the case where the indicated extension amount is greater than the upper limit and the actual extension amount is less than the upper limit, the control device 40 controls the sixth control valve(s) 17*f* to cause the lift cylinders 8*e* to extend to cause the rear ends (working device 2—side ends) of the lift arms 8*a* to ascend so that a transition occurs from the state in the upper part of FIG. 3B to the state in the lower part of FIG. 3B.

In the case where the indicated extension amount is less than the upper limit and the actual extension amount is equal to the indicated extension amount or in the case where the indicated extension amount is greater than the upper limit and the actual extension amount is equal to the upper limit, the control device 40 controls the sixth control valve(s) 17*f* to maintain the lift cylinders 8*e* to maintain the height of the lift arms 8*a*.

In the case where the indicated extension amount is less than the upper limit and the actual extension amount is greater than the indicated extension amount or in the case where the indicated extension amount is greater than the upper limit and the actual extension amount is greater than the upper limit, the control device 40 controls the sixth control valve(s) 17*f* to cause the lift cylinders 8*e* to retract to cause the rear ends (working device 2—side ends) of the lift arms 8*a* to descend so that a transition occurs from the state in the lower part of FIG. 3B to the state in the upper part of FIG. 3B.

Note that the control device 40 need only control the upward and downward movement of the lifting device 8 based on the operation of the position lever 42*g* and the upper limit setting dial 42*h*, and a method of such control is not limited to the method described above and an existing technique can be used. For example, the control device 40 may acquire a detection signal from an angle sensor for detecting the angle of the lift arms 8*a* instead of the extension sensor 41*f*, and may control the upward and downward movement of the lifting device 8 based on the angle of the lift arms 8*a*.

Figure 4A:
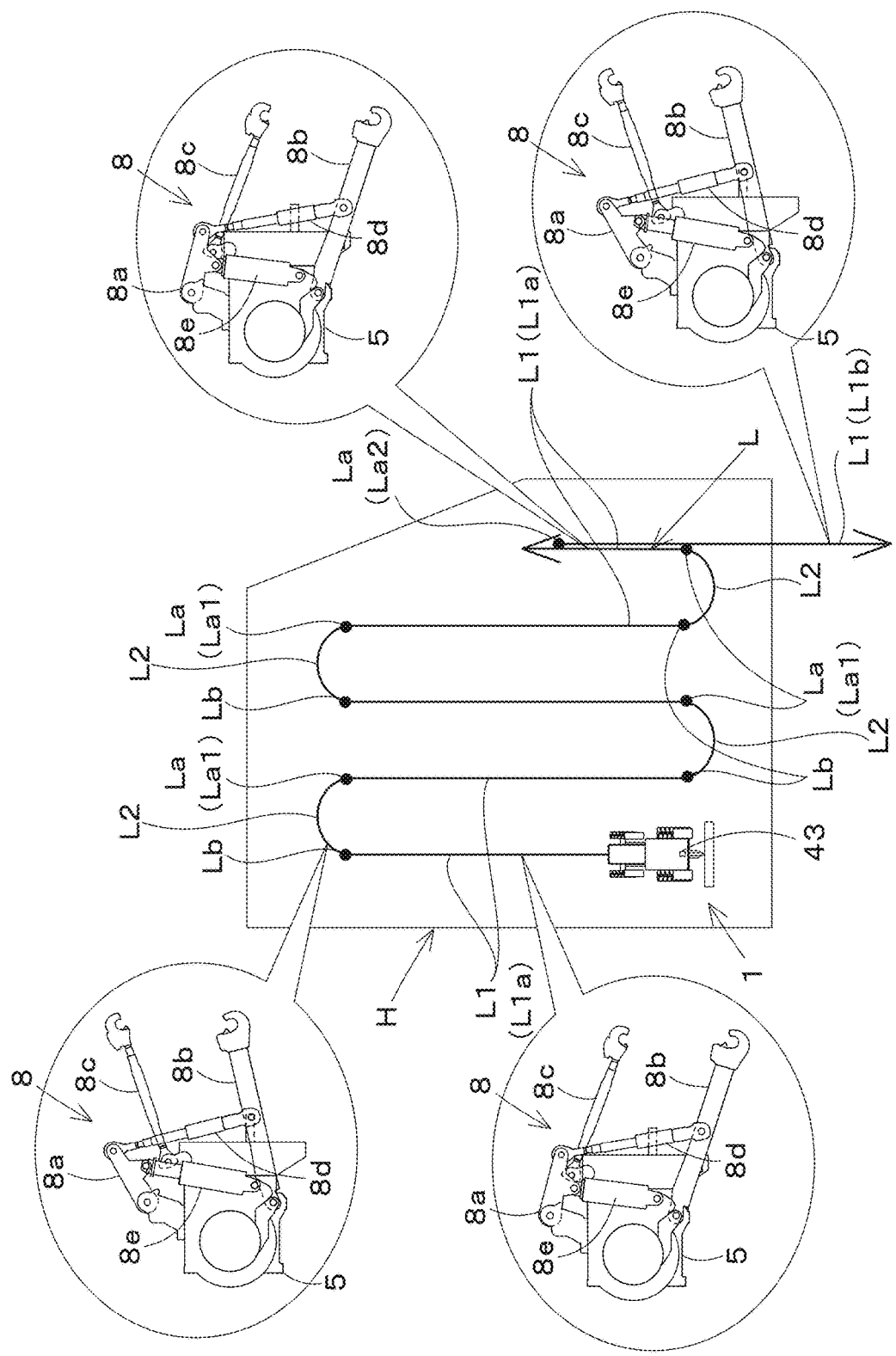
FIG. 4A illustrates a planned travel route.

Furthermore, the working machine 1 may include a position detecting device 43 to detect the position of the machine body 3 (machine body position W1) and an automatic travel control unit 40*a* to control automatic travel of the machine body 3 based on the machine body position W1, and may be configured to perform automatic travel according to a predetermined planned travel route L. As illustrated in FIG. 4A, the planned travel route L includes straight section(s) L1 in which the machine body 3 travels straight and turn section(s) L2 in which the machine body 3 turns. The straight section (s) L1 include forward travel section(s) L1*a* in which the machine body 3 travels forward and rearward travel section (s) L1*b* in which the machine body 3 travels rearward. The planned travel route L is set using a computer such as a personal computer (PC), a smartphone, or a tablet communicably connected to the working machine 1. The set planned travel route L is stored in, for example, the storage unit 44, the storage device 52, and/or the like.

The position detecting device 43 is capable of detecting the position thereof (position of the machine body 3) (measured position information including latitude and longitude) by a satellite positioning system (positioning satellites) such as D-GPS, GPS, GLONASS, BeiDou, Galileo, and/or Michibiki. Specifically, the position detecting device 43 receives satellite signals (positions of positioning satellites, time of transmission, correction information, and/or the like) from the positioning satellites, and detects the position (e.g., latitude and longitude) of the working machine 1 based on the satellite signals. In the present preferred embodiment, the position detecting device 43 is provided on an upper portion (roof) of the cabin 9 which covers the operator's seat 10 of the working machine 1, as illustrated in FIG. 7. Note that the position detecting device 43 need only be capable of detecting the position of the working machine 1, and the position at which the position detecting device 43 is attached and the configuration thereof are not limited to those described above.

As illustrated in FIG. 2, the control device 40 includes the automatic travel control unit 40*a*. The automatic travel control unit 40*a* includes electric/electronic circuit(s) in the control device 40, program(s) stored in a CPU and/or the like, and/or the like. The automatic travel control unit 40*a* controls the assist mechanism 11*c* so that the machine body 3 travels along the planned travel route L based on a control signal outputted from the control device 40. Specifically, the automatic travel control unit 40*a* acquires the planned travel route L from the storage unit 44 or the storage device 52 and, upon initiation of automatic travel, the automatic travel control unit 40*a* controls the assist mechanism 11*c* so that the machine body 3 travels along the planned travel route L, and controls the vehicle speed (speed) of the working machine 1 by automatically changing the speed stage of the transmission 5, the rotation speed of the prime mover 4, and/or the like. Furthermore, the automatic travel control unit 40*a* controls the lifting device 8 based on the planned travel route L. Specifically, the automatic travel control unit 40*a* includes a first control unit 40*a*1 which sets the angle of steering by the steering unit 11 and controls the transmission 5 and the prime mover 4 based on the planned travel route L.

The first control unit 40*a*1 includes electric/electronic circuit(s), program(s) stored in a CPU and/or the like, and/or the like, and performs control so that, when the working machine 1 is performing automatic travel, the machine body 3 travels along the planned travel route L. That is, if the deviation between the machine body 3 and the planned travel route L is less than a predetermined value, the automatic travel control unit 40*a* maintains the angle of rotation of the rotation shaft 11*b*. If the deviation between the machine body 3 and the planned travel route L is equal to or greater than the predetermined value, the automatic travel control unit 40*a* causes the rotation shaft 11*b* to rotate so that the deviation is zero.

Figure 4B:
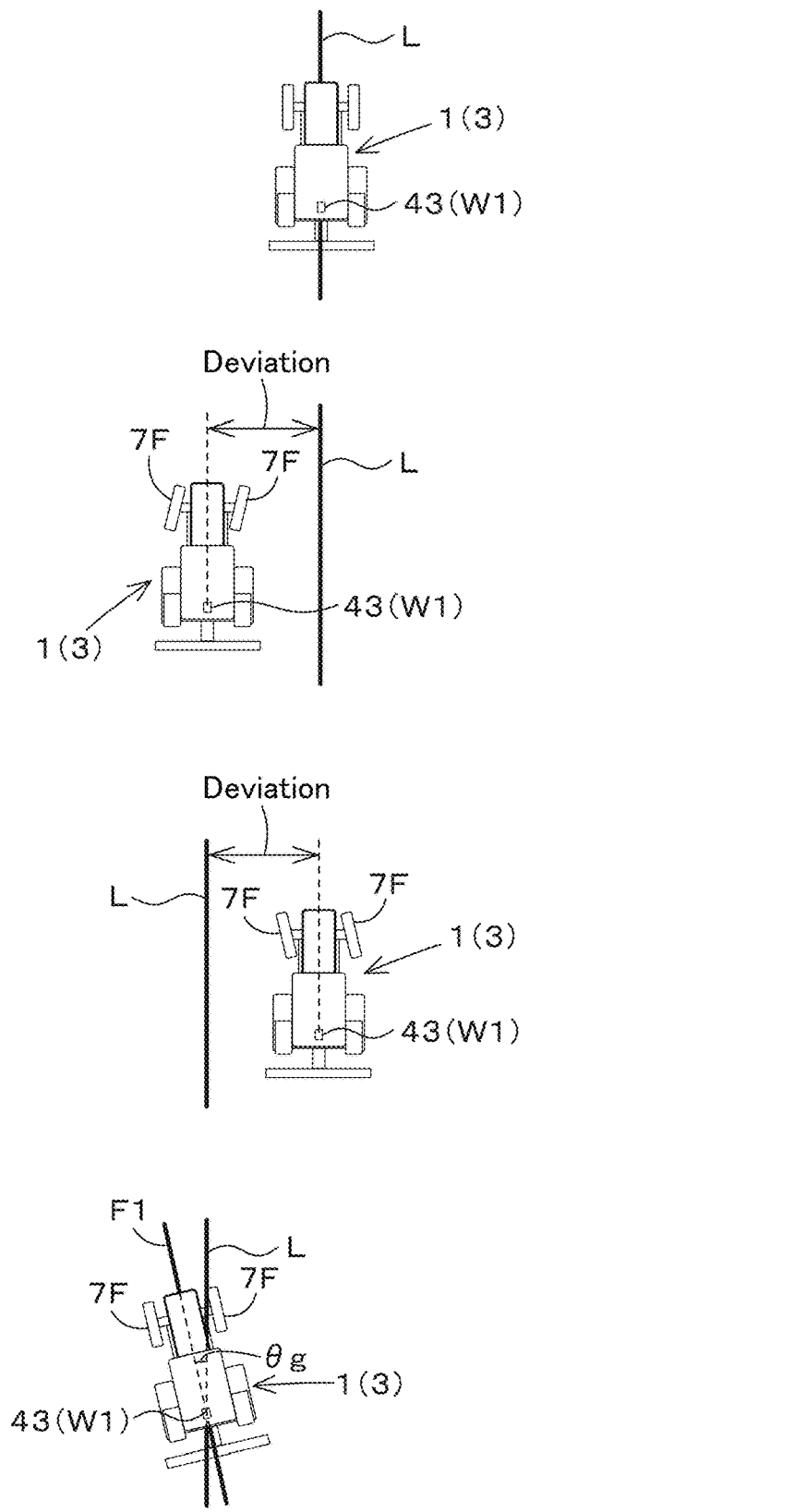
FIG. 4B illustrates automatic travel.

As illustrated in FIG. 4B, if the deviation (deviation in position) between the machine body position W1 and the planned travel route L is less than a predetermined set value, the first control unit 40*a*1 maintains the angle of rotation of the rotation shaft 11*b*. On the contrary, if the deviation in position between the machine body position W1 and the planned travel route L is equal to or greater than the set value and the working machine 1 is positioned leftward of the planned travel route L, the first control unit 40*a*1 causes the rotation shaft 11*b* to rotate so that the working machine 1 is steered right. If the deviation in position between the machine body position W1 and the planned travel route L is equal to or greater than the set value and the working machine 1 is positioned rightward of the planned travel route L, the first control unit 40*a*1 causes the rotation shaft 11*b* to rotate so that the working machine 1 is steered left.

Note that, although the angle of steering by the steering unit 11 is changed based on the deviation in position between the machine body position W1 and the planned travel route L in the above preferred embodiment, the first control unit 40*a*1 may, in the case where the direction of the planned travel route L and the travel direction F1 of the working machine 1 (machine body 3) (machine body heading direction) differ from each other, i.e., in the case where an angle (deviation in direction) θg of the machine body heading direction F1 to the planned travel route L is equal to or greater than a set value, set the angle of steering so that the angle θg is zero (the machine body heading direction F1 matches the direction of the planned travel route L), as illustrated in FIG. 4B. The first control unit 40*a*1 may set the final angle of steering for the automatic travel based on an angel of steering determined based on the deviation (deviation in position) and an angle of steering determined based on directions (deviation in direction) θg. Settings of the angle of steering in automatic travel in the above-described preferred embodiment are examples, and do not imply any limitation.

When the working machine 1 is performing automatic travel, the first control unit 40*a*1 controls the transmission 5 based on the planned travel route L to change vehicle speed and switch between forward travel and rearward travel. Assume for example that a vehicle speed associated with the planned travel route L is a speed v. The first control unit 40*a*1 calculates an actual vehicle speed based on a detection signal outputted from the vehicle speed sensor 41*h*, and, if the actual vehicle speed is less than the speed v, the first control unit 40*a*1 automatically changes speed stages of the main transmission unit 5*c* or the auxiliary transmission unit 5*d* or controls the rotation speed of the prime mover 4 to increase speed. If the actual speed is equal to the speed v, the first control unit 40*a*1 automatically changes speed stages of the main transmission unit 5*c* or the auxiliary transmission unit 5*d* or controls the rotation speed of the prime mover 4 to maintain vehicle speed. If the actual speed is greater than the speed v, the first control unit 40*a*1 automatically changes speed stages of the main transmission unit 5*c* or the auxiliary transmission unit 5*d* or controls the rotation speed of the prime mover 4 to reduce speed.

The first control unit 40*a*1 actuates the forward/reverse switching unit 5*b*2 of the shuttle unit 5*b* to change forward travel to rearward travel or from rearward travel to forward travel, based on the planned travel route L. For example, if the machine body position W1 detected by the position detecting device 43 is located in a forward travel section L1*a* of a straight section L1, the first control unit 40*a*1 changes the degree of opening of the first control valve 17*a* to bring the forward clutch unit 35 into the engaged state and changes the degree of opening of the second control valve 17*b* to bring the reverse clutch unit 36 into the disengaged state, to switch the transmission 5 (traveling device 7) to forward travel. On the contrary, if the machine body position W1 detected by the position detecting device 43 is located in a rearward travel section L1*b* of a straight section L1, the first control unit 40*a*1 changes the degree of opening of the first control valve 17*a* to bring the forward clutch unit 35 into the disengaged state and changes the degree of opening of the second control valve 17*b* to bring the reverse clutch unit 36 into the engaged state, to switch the transmission 5 (traveling device 7) to rearward travel.

As illustrated in FIG. 2, the automatic travel control unit 40*a* includes a second control unit (lifting control unit) 40*a*2 to control the upward and downward movement of the lifting device 8 based on the planned travel route L. The lifting control unit 40*a*2 includes electric/electronic circuit(s), program(s) stored in a CPU and/or the like, and/or the like, and controls the lifting device 8 to move up with the working device 2 from the grounding state to the ungrounding state. The lifting control unit 40*a*2 causes the working device 2 to be raised from the grounding state to the ungrounding state before the first control unit 40*a*1 causes the machine body 3 to turn or travel rearward. In other words, the automatic travel control unit 40*a* (first control unit 40*a*1) causes the machine body 3 to turn or travel rearward after the lifting control unit 40*a*2 controls the lifting device 8 to move up with the working device 2 from the grounding state to the ungrounding state.

First, the following description discusses a case in which the lifting control unit 40*a*2 causes the working device 2 to be raised from the grounding state to the ungrounding state before the first control unit 40*a*1 causes the machine body 3 to turn. The lifting control unit 40*a*2 controls the lifting device 8 to move up with the working device 2 from the grounding state to the ungrounding state when the machine body 3 is at a start point Lb of a turn section L2 or is about to enter the start point Lb. Specifically, if the machine body position W1 detected by the position detecting device 43 is located at a position short of the start point Lb of the turn section L2, the lifting control unit 40a2 controls the sixth control valve(s) 17f based on a pre-set height (first height: the height of the lifting device 8 in the ungrounding state) to cause the lift cylinders 8e to extend to cause the rear ends (working device 2—side ends) of the lift arms 8a to ascend, thereby raising the working device 2 from the grounding state to the ungrounding state.

If the machine body position W1 is located at the start point Lb of the turn section L2 and the working device 2 is not in the ungrounding state, the lifting control unit 40a2 outputs a stop signal to the first control unit 40a1. Specifically, the lifting control unit 40a2 determines, based on the planned travel route L, the machine body position W1 detected by the position detecting device 43, and the actual extension amount calculated by the control device 40, whether or not the machine body position W1 is located at the start point Lb of the turn section L2 and whether or not the working device 2 is in the ungrounding state. Upon acquisition of the stop signal, the first control unit 40a1 stops the traveling device 7 from traveling.

On the contrary, if the machine body position W1 is located at the start point Lb of the turn section L2 and the working device 2 is in the ungrounding state, the lifting control unit 40a2 outputs an enabling signal to the first control unit 40a1. With this, the first control unit 40a1 causes the traveling device 7 to continue traveling or resume traveling.

Note that the lifting control unit 40a2 need only cause the working device 2 to be raised from the grounding state to the ungrounding state when the machine body 3 is at a start point Lb of a turn section L2 or about to enter the start point Lb. The lifting control unit 40a2 may control the lifting device 8 to move up with the working device 2 from the grounding state to the ungrounding state when the machine body position W1 detected by the position detecting device 43 is located at the start point Lb of the turn section L2, not at a position short of the start point Lb of the turn section L2. In such a case, if the machine body position W1 is located at the start point Lb of the turn section L2 and the working device 2 is in the grounding state, the lifting control unit 40a2 outputs a stop signal to the first control unit 40a1 and the first control unit 40a1 stops the traveling device 7 from traveling. If the machine body position W1 is located at the start point Lb of the turn section L2 and the working device 2 is in the ungrounding state, the lifting control unit 40a2 outputs an enabling signal to the first control unit 40a1 and the first control unit 40a1 causes the traveling device 7 to resume traveling.

Next, the following description discusses a case in which the lifting control unit 40a2 causes the working device 2 to be raised from the grounding state to the ungrounding state before the first control unit 40a1 causes the machine body 3 to travel rearward. The lifting control unit 40a2 controls the lifting device 8 to move up with the working device 2 from the grounding state to the ungrounding state when the machine body 3 is at a start point La2 of a rearward travel section L1b or is about to enter the start point La2. Specifically, if the machine body position W1 detected by the position detecting device 43 is located at a position short of the start point La1 of the rearward travel section L1b, the lifting control unit 40a2 controls the sixth control valve(s) 17f based on a pre-set height (first height) to cause the lift cylinders 8e to extend to cause the rear ends (working device 2—side ends) of the lift arms 8a to move upward from the grounding state to the ungrounding state, thereby raising the working device 2.

Furthermore, if the machine body position W1 is located at the start point La2 of the rearward travel section L1b and the working device 2 is not in the ungrounding state, the lifting control unit 40a2 outputs a stop signal to the first control unit 40a1. Specifically, the lifting control unit 40a2 determines, based on the planned travel route L, the machine body position W1 detected by the position detecting device 43, and the actual extension amount calculated by the control device 40, whether or not the machine body position W1 is located at the start point La2 of the rearward travel section L1b and whether or not the working device 2 is in the ungrounding state. Upon acquisition of the stop signal, the first control unit 40a1 stops the traveling device 7 from traveling.

On the contrary, if the machine body position W1 is located at the start point La2 of the rearward travel section L1b and the working device 2 is in the ungrounding state, the lifting control unit 40a2 outputs an enabling signal to the first control unit 40a1. With this, the first control unit 40a1 causes the traveling device 7 to continue traveling or resume traveling.

Note that the lifting control unit 40a2 need only cause the working device 2 to be raised from the grounding state to the ungrounding state when the machine body 3 is at a start point La2 of a rearward travel section L1b or about to enter the start point La2. The lifting control unit 40a2 may control the lifting device 8 to move up with the working device 2 from the grounding state to the ungrounding state when the machine body position W1 detected by the position detecting device 43 is located at the start point La2 of the rearward travel section L1b, not at a position short of the start point La2 of the rearward travel section L1b. In such a case, if the machine body position W1 is located at the start point La1 of the rearward travel section L1b and the working device 2 is in the grounding state, the lifting control unit 40a2 outputs a stop signal to the first control unit 40a1 and the first control unit 40a1 stops the traveling device 7 from traveling. If the machine body position W1 is located at the start point La2 of the rearward travel section L1b and the working device 2 is in the ungrounding state, the lifting control unit 40a2 outputs an enabling signal to the first control unit 40a1 and the first control unit 40a1 causes the traveling device 7 to resume traveling.

Furthermore, the lifting control unit 40a2 causes the working device 2 to be lowered from the ungrounding state to the grounding state before the first control unit 40a1 causes the machine body 3 having turned to start traveling straight or causes the machine body 3 having traveled rearward to start traveling forward. In other words, the automatic travel control unit 40a (first control unit 40a1) causes the machine body 3 having turned to start traveling straight or causes the machine body 3 having traveled rearward to start traveling forward after the lifting control unit 40a2 controls the lifting device 8 to move down with the working device 2 from the ungrounding state to the grounding state.

First, the following description discusses a case in which the lifting control unit 40a2 causes the working device 2 to be lowered from the ungrounding state to the grounding state before the first control unit 40a1 causes the machine body 3 having turned to start traveling straight. The lifting control unit 40a2 controls the lifting device 8 to move down with the working device 2 from the ungrounding state to the grounding state when the machine body 3 is at a start point La of a straight section L1 or is about to enter the start point La. Specifically, if the machine body position W1 detected by the position detecting device 43 is located at a position short of the start point La of the straight section L1, the lifting control unit 40a2 controls the sixth control valve(s) 17f based on a pre-set height (second height: the height of the lifting device 8 in the grounding state) to cause the lift cylinders 8e to retract to cause the rear ends (working device 2—side ends) of the lift arms 8a to move downward from the ungrounding state to the grounding state, thereby lowering the working device 2.

Furthermore, if the machine body position W1 is located at the start point La of the straight section L1 and the working device 2 is not in the grounding state, the lifting control unit 40a2 outputs a stop signal to the first control unit 40a1. Specifically, the lifting control unit 40a2 determines, based on the planned travel route L, the machine body position W1 detected by the position detecting device 43, and the actual extension amount calculated by the control device 40, whether or not the machine body position W1 is located at the start point La of the straight section L1 and whether or not the working device 2 is in the grounding state. Upon acquisition of the stop signal, the first control unit 40a1 stops the traveling device 7 from traveling.

On the contrary, if the machine body position W1 is located at the start point La of the straight section L1 and the working device 2 is in the grounding state, the lifting control unit 40a2 outputs an enabling signal to the first control unit 40a1. With this, the first control unit 40a1 causes the traveling device 7 to continue traveling or resume traveling.

Note that the lifting control unit 40a2 need only cause the working device 2 to be lowered from the ungrounding state to the grounding state when the machine body 3 is at a start point La of a straight section L1 or is about to enter the start point La. The lifting control unit 40a2 may control the lifting device 8 to move down with the working device 2 from the ungrounding state to the grounding state when the machine body position W1 detected by the position detecting device 43 is located at the start point La of the straight section L1, not at a position short of the start point La of the straight section L1. In such a case, if the machine body position W1 is located at the start point La of the straight section L1 and the working device 2 is in the ungrounding state, the lifting control unit 40a2 outputs a stop signal to the first control unit 40a1 and the first control unit 40a1 stops the traveling device 7 from traveling. If the machine body position W1 is located at the start point La of the straight section L1 and the working device 2 is in the grounding state, the lifting control unit 40a2 outputs an enabling signal to the first control unit 40a1 and the first control unit 40a1 causes the traveling device 7 to resume traveling.

Next, the following description discusses a case in which the lifting control unit 40a2 causes the working device 2 to be lowered from the ungrounding state to the grounding state before the first control unit 40a1 causes the machine body 3 having traveled rearward to start traveling forward. The lifting control unit 40a2 controls the lifting device 8 to move down with the working device 2 from the ungrounding state to the grounding state when the machine body 3 is at a start point La1 of a forward travel section L1a or is about to enter the start point La1. Specifically, if the machine body position W1 detected by the position detecting device 43 is located at a position short of the start point La1 of the forward travel section L1a, the lifting control unit 40a2 controls the sixth control valve(s) 17f based on a pre-set height (second height) to cause the lift cylinders 8e to retract to cause the rear ends (working device 2—side ends) of the lift arms 8a to move downward from the ungrounding state to the grounding state, thereby lowering the working device 2.

Furthermore, if the machine body position W1 is located at the start point La1 of the forward travel section L1a and the working device 2 is not in the grounding state, the lifting control unit 40a2 outputs a stop signal to the first control unit 40a1. Specifically, the lifting control unit 40a2 determines, based on the planned travel route L, the machine body position W1 detected by the position detecting device 43, and the actual extension amount calculated by the control device 40, whether or not the machine body position W1 is located at the start point La1 of the forward travel section L1a and whether or not the working device 2 is in the grounding state. Upon acquisition of the stop signal, the first control unit 40a1 stops the traveling device 7 from traveling.

On the contrary, if the machine body position W1 is located at the start point La1 of the forward travel section L1a and the working device 2 is in the grounding state, the lifting control unit 40a2 outputs an enabling signal to the first control unit 40a1. With this, the first control unit 40a1 causes the traveling device 7 to continue traveling or resume traveling.

Note that the lifting control unit 40a2 need only cause the working device 2 to be lowered from the ungrounding state to the grounding state when the machine body 3 is at a start point La1 of a forward travel section L1a or is about to enter the start point La1. The lifting control unit 40a2 may control the lifting device 8 to move down with the working device 2 from the ungrounding state to the grounding state when the machine body position W1 detected by the position detecting device 43 is located at the start point La1 of the forward travel section L1a, not at a position short of the start point La1 of the forward travel section L1a. In such a case, if the machine body position W1 is located at the start point La1 of the forward travel section L1a and the working device 2 is in the ungrounding state, the lifting control unit 40a2 outputs a stop signal to the first control unit 40a1 and the first control unit 40a1 stops the traveling device 7 from traveling. Furthermore, if the machine body position W1 is located at the start point La1 of the forward travel section L1a and the working device 2 is in the grounding state, the lifting control unit 40a2 outputs an enabling signal to the first control unit 40a1 and the first control unit 40a1 causes the traveling device 7 to resume traveling.

The working machine 1 includes an input device to receive input of the height of the lifting device 8 in the ungrounding state. Specifically, the input device is capable of receiving input of at least the foregoing first height, and the lifting control unit 40a2 controls the lifting device 8, based on the height (first height) received by the input device, to move up with the working device 2 from the grounding state to the ungrounding state. In the present preferred embodiment, the input device receives input of the second height in addition to the first height. The input device is a device capable of receiving input of height, and is, for example, the display device 50 capable of displaying an input screen or operation switch(es) by which predetermined first and second heights can be inputted. In the present preferred embodiment, the input device is the display device 50. The first height and the second height inputted into and received by the display device (input device) 50 are stored in the storage device 52 or the storage unit 44.

Figure 5B:
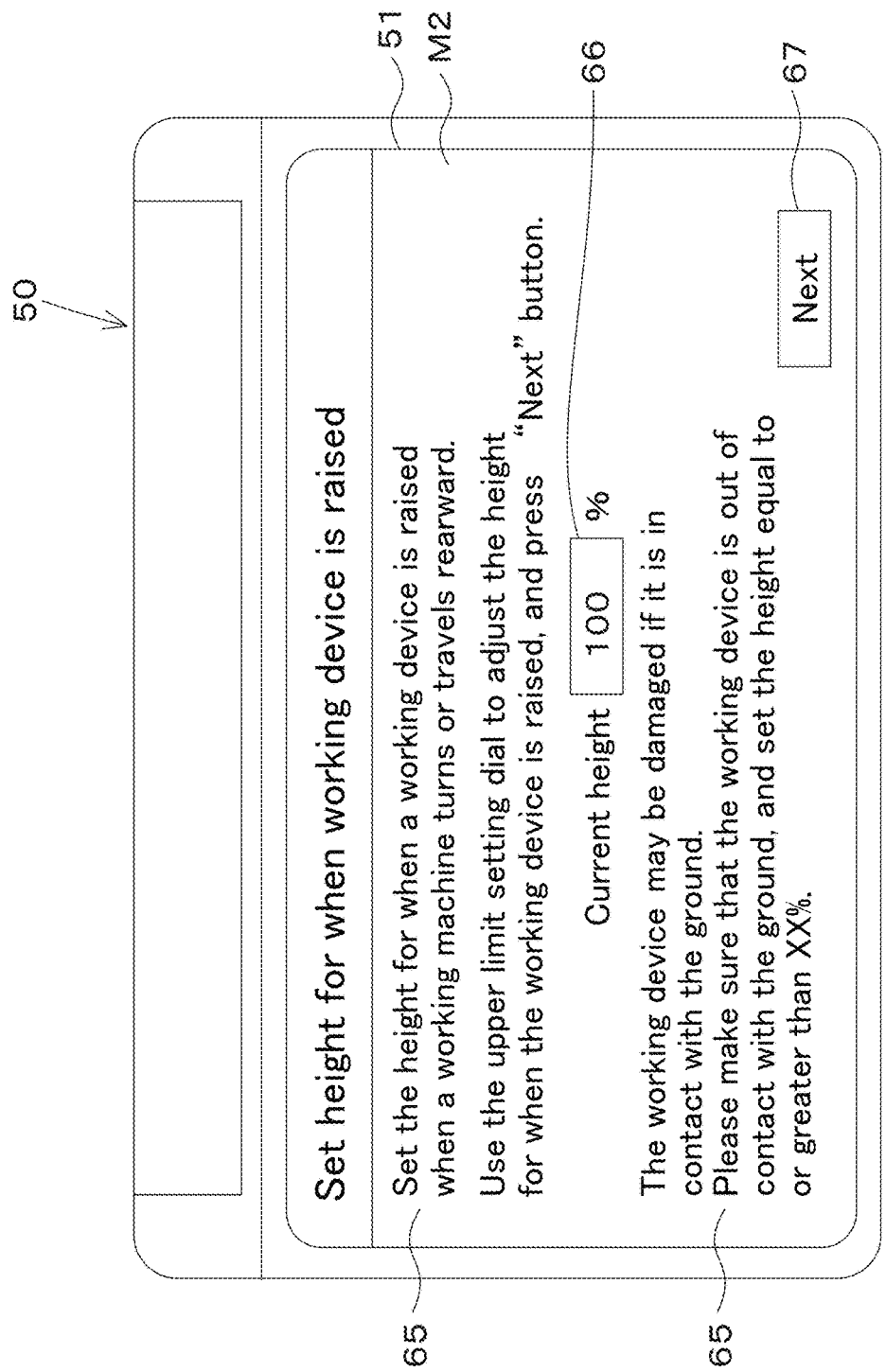
FIG. 5B illustrates an example of a first input screen displayed on the display unit.
Figure 5C:
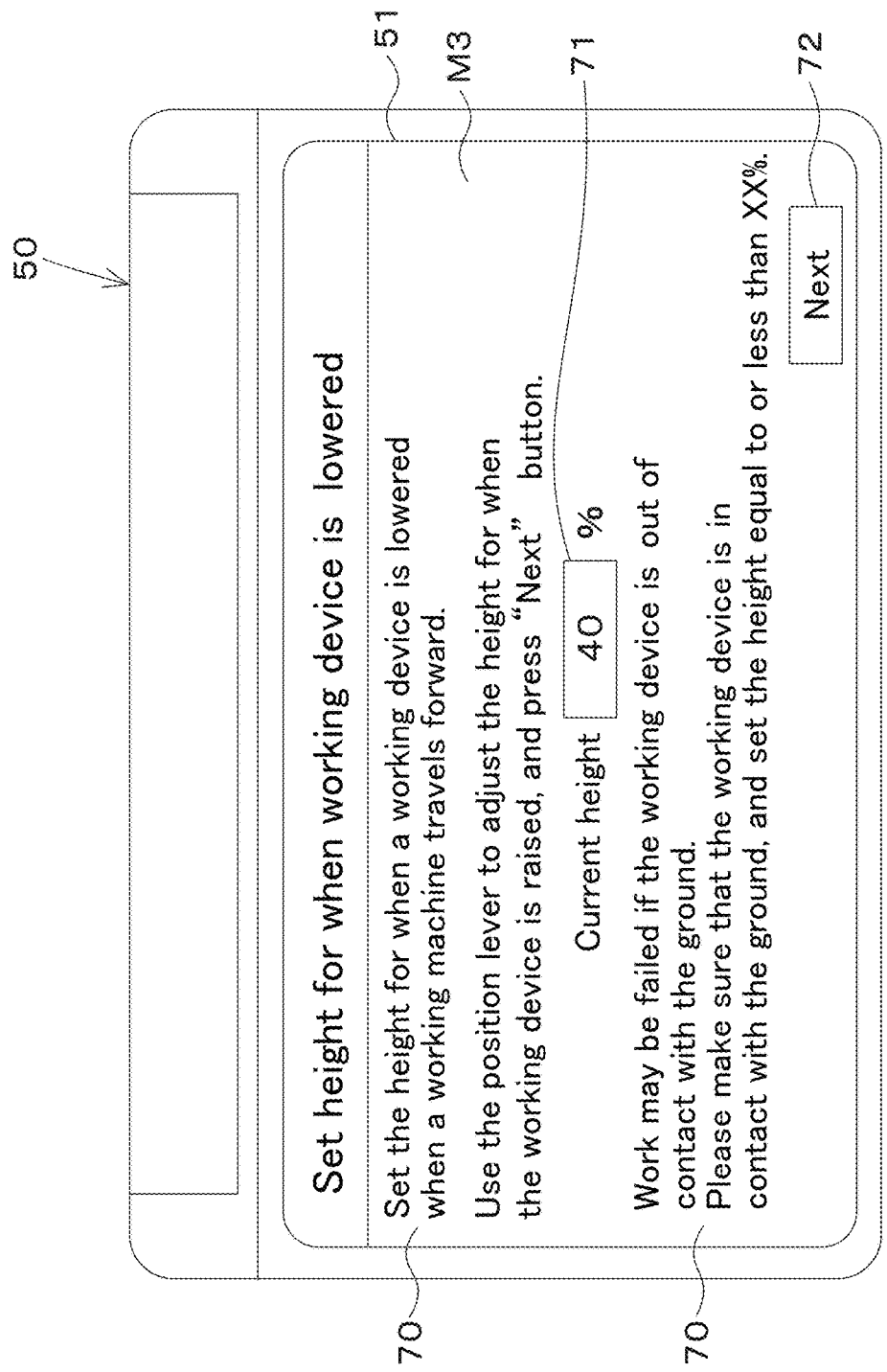
FIG. 5C illustrates an example of a second input screen displayed on the display unit.

As illustrated in FIGS. 5A, 5B, and 5C, the display unit 51 of the display device 50 displays, for example, a guide screen M1 which provides guidance of a method of inputting a first height, an input screen to receive input of a first height (such a screen is hereinafter referred to as "first input screen M2"), and an input screen to receive input of a second height (such a screen is hereinafter referred to as "second input screen M3").

As illustrated in FIG. 5A, upon a predetermined operation on the display device 50 by an operator, the display device 50 displays the guide screen M1 on the display unit 51, and the guide screen M1 displays a first guidance section 61 which provides guidance of a method of inputting a first height. The first guidance section 61 displays, for example, instructions for the operator to raise the position lever 42$g$ to the fully raised position. Note that, although the first guidance section 61 indicates a method of inputting a first height using predetermined text in the present preferred embodiment, a configuration in which the method is indicated by icon(s) and/or drawing(s) may be used.

Furthermore, as illustrated in FIG. 5A, the guide screen M1 may display a selection section 62 in which working device(s) 2 is/are selected. The selection section 62 is a section in which the working device 2 linked to the lifting device 8 is manually selected, and, for example, displays a list of working device(s) 2. Note that the method of selecting working device(s) 2 in the selection section 62 is not limited to the list as described above, and a configuration in which a working device 2 is selected by inputting the name of the working device 2 may be used. An existing technique may be used. Once the position lever 42$g$ has been raised to the fully raised position, an operation signal of the position lever 42$g$ is inputted into the control device 40, and the display device 50 acquires the operation signal via the control device 40. Upon acquisition of the operation signal indicating that the position lever 42$g$ has been raised to the fully raised position, the display device 50 displays the first input screen M2 on the display unit 51.

Figure 5D:
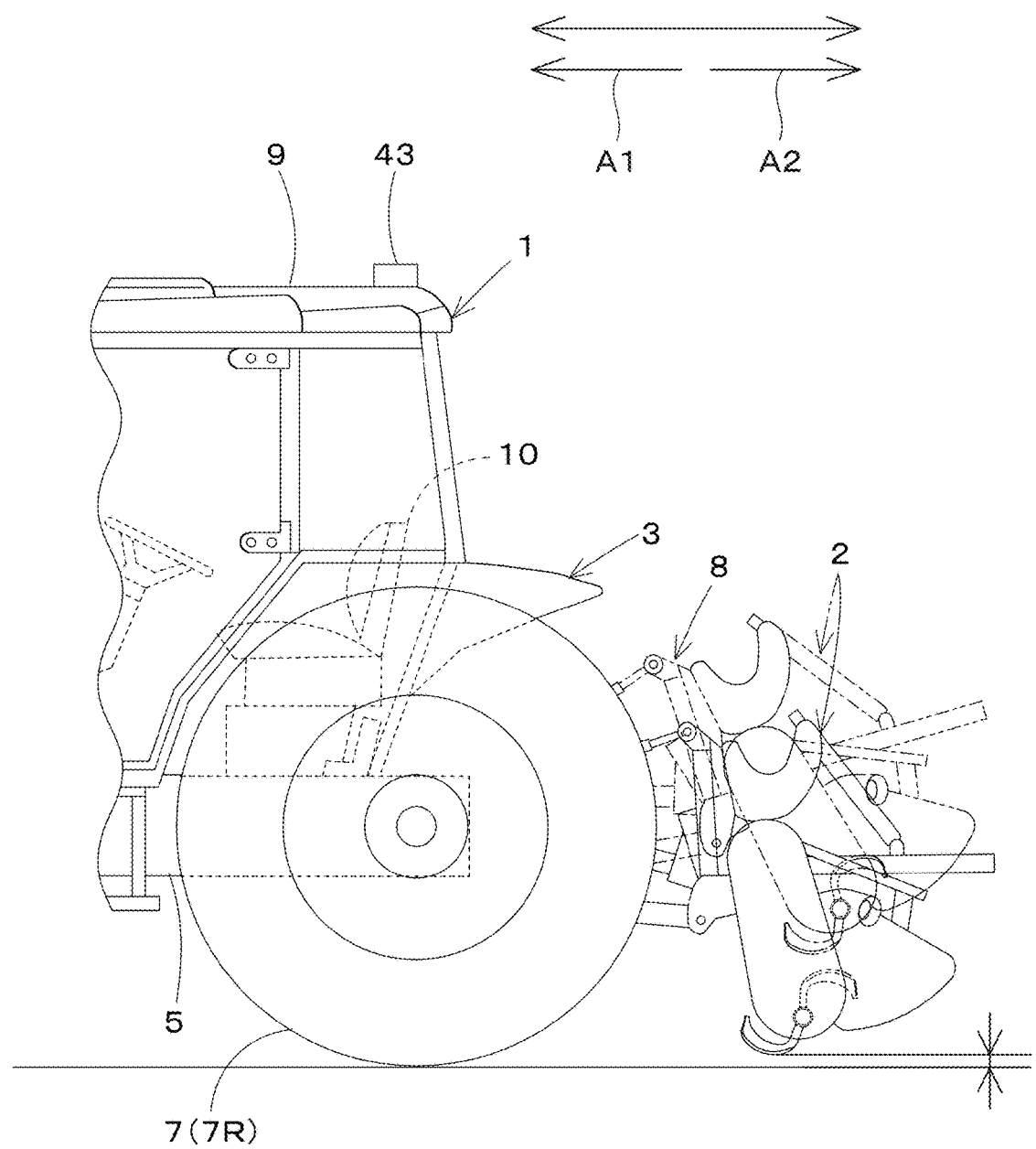
FIG. 5D illustrates a working device in height setting performed via an input device.

The display device 50 acquires the actual extension amount calculated by the control device 40, and receives input of a first height based on the actual extension amount. Specifically, as illustrated in FIG. 5B, the first input screen M2 displays a second guidance section 65 which provides guidance of a method of inputting a first height independently of the first guidance section 61, a first height display section 66 in which the height of the lifting device 8 based on the actual extension amount is displayed, and a first reception member 67 for confirmation of the input of the first height. The second guidance section 65 indicates, for example, that the upper limit setting dial 42$h$ be operated to cause the lifting device 8 to move down with the working device 2 to the ungrounding state. Upon operation of the upper limit setting dial 42$h$ by an operator so that the working device 2 is in the ungrounding state, the lifting device 8 moves downward as illustrated in FIG. 5D.

As illustrated in FIG. 5B, the first height display section 66 displays the height of the lifting device 8 based on the actual extension amount in terms of, for example, the degree of upward movement of the lifting device 8 (where 100% represents the degree of upward movement of the lifting device 8 in the case where the upper limit setting dial 42$h$ is operated to the fully raised position). Thus, the first height display section 66 changes the displayed value according to the operation of the upper limit setting dial 42$h$.

As illustrated in FIG. 5B, the first reception member 67 is an operable piece of graphics displayed on the display unit 51 in the present preferred embodiment, and is a "Next" button in the present preferred embodiment. Upon operation of the first reception member 67, the display device 50 acquires the actual extension amount calculated by the control device 40, and determines whether or not the height based on the actual extension amount (first input height) is equal to or greater than a predetermined first threshold. If the first input height is equal to or greater than the first threshold, the display device 50 receives the first input height as the input of the first height. On the contrary, if the first input height is less than the first threshold, the display device 50 does not receive the first input height as the input of the first height and causes the display unit 51 to display a predetermined warning screen. Note that the first threshold is a predetermined value pre-stored in the storage device 52 and may be changed as desired.

Once the first reception member 67 has been operated and the display device 50 has received the first input height as the input of the first height, the display device 50 causes the storage device 52 to store the working device 2 selected on the guide screen M1 and the inputted and received first height such that the working device 2 and the first height are associated with each other.

Once the display device 50 has caused the storage device 52 to store the first height, the display device 50 displays the second input screen M3 on the display unit 51 as illustrated in FIG. 5C. The display device 50 acquires the actual extension amount calculated by the control device 40, and receives, on the second input screen M3, input of the second height based on the actual extension amount. Specifically, as illustrated in FIG. 5C, the second input screen M3 displays a third guidance section 70 which provides guidance of a method of inputting a second height, a second height display section 71 to display the height of the lifting device 8 based on the actual extension amount, and a second reception member 72 to receive input of the second height. The third guidance section 70 indicates, for example, that the position lever 42$g$ be operated to cause the lifting device 8 to perform raising or lowering so that the working device 2 is brought into the grounding state.

As illustrated in FIG. 5C, the second height display section 71 displays the height of the lifting device 8 based on the actual extension amount in terms of, for example, the degree of upward movement of the lifting device 8 (where 100% represents the degree of upward movement of the lifting device 8 in the case where the position lever 42$g$ is operated to the fully raised position). Thus, the second height display section 71 changes the displayed value according to the operation of the position lever 42$g$.

As illustrated in FIG. 5C, the second reception member 72 is an operable piece of graphics displayed on the display unit 51 in the present preferred embodiment, and is a "Next" button in the present preferred embodiment. Upon operation of the second reception member 72, the display device 50 acquires the actual extension amount calculated by the control device 40, and determines whether or not the height based on the actual extension amount (second input height) is equal to or less than a predetermined second threshold. If the second input height is equal to or less than the second threshold, the display device 50 receives the second input height as the input of the second height. On the contrary, if the second input height is greater than the second threshold, the display device 50 does not receive the second input height as the input of the second height and causes the display unit 51 to display a predetermined warning screen. Note that the second threshold is a predetermined value pre-stored in the storage device 52 and may be changed as desired.

Once the second reception member 72 has been operated and the display device 50 has received the second input height as the input of the second height, the display device 50 causes the storage device 52 to store the working device 2 selected on the guide screen M1 and the inputted and received second height such that the working device 2 and the second height are associated with each other. The display device 50 causes the storage device 52 to store the second height. The second control unit (lifting control unit) 40a2 acquires the first height and the second height from the storage device 52 according to the working device 2 linked to the lifting device 8, controls the lifting device 8 based on the first height and the second height inputted into and received by the display device 50, i.e., the extension amount corresponding to the first height and the extension amount corresponding to the second height, to move up with the working device 2 from the grounding state to the ungrounding state or move down with the working device 2 from the ungrounding state to the grounding state. Note that the display device 50 may acquire information of the working device 2 by displaying a predetermined selection screen and allowing the operator to select the working device 2 linked to the lifting device 8, and any method can be used as the method of the acquisition.

Note that, although the first height is set and then the second height is set on the second input screen M3 on the display device 50 in the present preferred embodiment, the display device 50 need only allow the first height and the second height to be set before the automatic travel control unit 40a starts automatic travel of the working machine 1. The order in which the first height and the second height are set is not limited as such. For example, the second height may be set when the automatic travel control unit 40a starts automatic travel of the working machine 1.

As illustrated in FIG. 2, the working machine 1 includes a correcting unit 45. The correcting unit 45 corrects the height (first height) received by the input device (display device 50) based on a predetermined correction value so that the corrected height is higher than the first height. In the present preferred embodiment, the correcting unit 45 is included in the lifting control unit 40a2, and includes electric/electronic circuit(s), program(s) stored in a CPU and/or the like, and/or the like. The correction value is pre-stored in the storage device 52, and a configuration in which the set correction value can be changed as desired by operating the display device 50 can be used. The correcting unit 45 acquires the correction value from the storage device 52 and multiplies the first height received by the display device 50 by the correction value (for example, α=1.1) to obtain the corrected first height higher than the first height. In the present preferred embodiment, in the case of raising the working device 2 from the grounding state to the ungrounding state, the lifting control unit 40a2 causes the lifting device 8 to move up based on the corrected first height. Note that the correcting unit 45 need only correct the first height received by the display device 50 so that the corrected first height is higher than the first height based on a predetermined correction value, and the correction value and a method of calculation thereof are not limited to those described above. For example, the correcting unit 45 may set the corrected first height higher than the first height by adding a correction value to the first height.

As illustrated in FIG. 2, the working machine 1 includes a notifying device 46. In the case where the automatic travel control unit 40a causes the machine body 3 to turn or travel rearward, the notifying device 46 provides a predetermined warning for a period of time during which the lifting control unit 40a2 controls the lifting device 8 to move up with the working device 2 from the grounding state to the ungrounding state. Specifically, in the case where the first control unit 40a1 causes the machine body 3 to turn or travel rearward, the automatic travel control unit 40a causes the notifying device 46 to provide a predetermined warning for a period during which the lifting control unit 40a2 causes the working device 2 to be raised from the grounding state to the ungrounding state. The notifying device 46 may, in the case where the automatic travel control unit 40a causes the machine body 3 having turned to start traveling straight or causes the machine body 3 having traveled rearward to start traveling forward, provide a predetermined warning for a period of time during which the lifting control unit 40a2 controls the lifting device 8 to move down with the working device 2 from the ungrounding state to the grounding state. In such a case, in the case where the first control unit 40a1 causes the machine body 3 having turned to start traveling straight or causes the machine body 3 having traveled rearward to start traveling forward, the automatic travel control unit 40a causes the notifying device 46 to provide a predetermined warning for a period of time during which the lifting control unit 40a2 causes the working device 2 to be lowered from the ungrounding state to the grounding state.

The notifying device 46 is communicably connected to the control device 40, and is controlled by the control device 40 (automatic travel control unit 40a). The notifying device 46 provides a notification indicating that the working device 2 is raised from the grounding state to the ungrounding state via sound, light, graphics, or a combination thereof. Specifically, in the case where the notifying device 46 provides a notification via sound, the notifying device 46 is a sound output device (speaker) which provides a notification via sound. Note that, in the case where the notifying device 46 provides a notification indicating that the working device 2 is raised from the grounding state to the ungrounding state via graphics, the notifying device 46 is the display device 50, and the display device 50 displays a predetermined warning screen. The notifying device 46 may be a light emitting device (indicator) which is provided in the vicinity of the operator's seat and which includes a plurality of lamps (for example, LED bulbs). The notifying device 46 is at least one of the following: the display device 50, a sound output device, and a light emitting device.

Figure 6A:
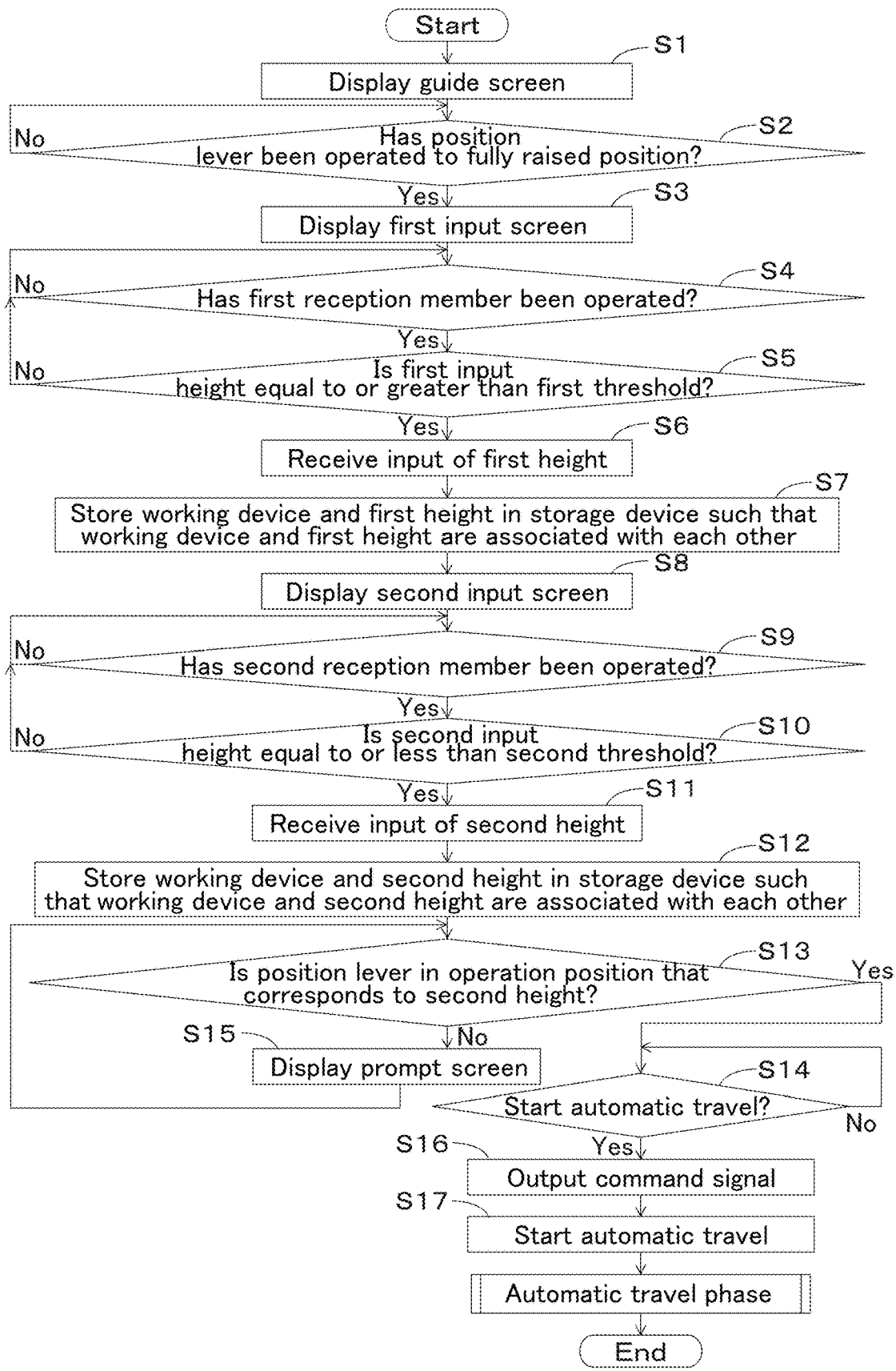
FIG. 6A is a chart showing a flow of height setting via the input device.

The following description discusses a flow in which the display device (input device) 50 receives input of heights (the first height and the second height) of the lifting device 8, the automatic travel control unit 40a starts automatic travel of the working machine 1, and the lifting control unit 40a2 controls the lifting device 8. As shown in FIG. 6A, when an operator performs a predetermined operation on the display device 50, the display device 50 displays the guide screen M1 on the display unit 51 (S1). Once the guide screen M1 has been displayed on the display unit 51, the display device 50 determines whether or not the position lever 42g has been operated to a fully raised position based on a signal inputted from the control device 40 (S2).

In the case where the operator has fully raised the position lever 42g, where the control device 40 has outputted an operation signal indicating that the position lever 42g has been operated to a fully raised position to the display device 50, and where the display device 50 has determined that the position lever 42g has been operated to a fully raised position (Yes in S2), the display device 50 displays the first input screen M2 on the display unit 51 (S3).

As shown in FIG. 6A, once the display device 50 has displayed the first input screen M2 on the display unit 51 (S3), the display device 50 determines whether or not the first reception member 67 has been operated (S4). If the display device 50 determines that the first reception member 67 has been operated (Yes in S4), that is, in the case where the operator has operated the upper limit setting dial 42h to cause the working device 2 to be raised or lowered by the lifting device 8 so that the working device 2 is in the ungrounding state and has operated the first reception member 67, the display device 50 acquires the actual extension amount calculated by the control device 40 and determines whether or not the height based on the actual extension amount (first input height) is equal to or greater than the first threshold (S5). If the first input height is equal to or greater than the first threshold (Yes in S5), the display device 50 receives the first input height as input of the first height (S6). Once the first reception member 67 has been operated and the display device 50 has received the first input height as input of the first height (S6), the display device 50 causes the storage device 52 to store the working device 2 selected on the guide screen M1 and the inputted and received first height such that the working device 2 and the first height are associated with each other (S7).

As shown in FIG. 6A, once the display device 50 has caused the storage device 52 to store the first height (S7), the display device 50 displays the second input screen M3 on the display unit 51 (S8). Once the display device 50 has displayed the second input screen M3 on the display unit 51 (S8), the display device 50 determines whether or not the second reception member 72 has been operated (S9). If the display device 50 determines that the second reception member 72 has been operated (Yes in S9), that is, in the case where the operator has operated the position lever 42g to cause the working device 2 to be raised or lowered by the lifting device 8 so that the working device 2 is in the grounding state and has operated the second reception member 72, the display device 50 acquires the actual extension amount calculated by the control device 40 and determines whether or not the height based on the actual extension amount (second input height) is equal to or less than the second threshold (S10).

As shown in FIG. 6A, if the second input height is equal to or less than the second threshold (Yes in S10), the display device 50 receives the second input height as input of the second height (S11). Once the second reception member 72 has been operated and the display device 50 has received the second input height as input of the second height (S11), the display device 50 causes the storage device 52 to store the working device 2 selected on the guide screen M1 and the inputted and received second height such that the working device 2 and the second height are associated with each other (S12).

As shown in FIG. 6A, once the display device 50 has caused the storage device 52 to store the second height (S12), the display device 50 determines whether or not the position lever 42g is in the operation position that corresponds to the second height (S13). The display device 50 acquires an operation signal of the position lever 42g via the control device 40 from the storage device 52, and determines whether or not the position lever 42g is in the operation position that corresponds to the second height based on the acquired operation signal. If the display device 50 determines that the position lever 42g is in the operation position that corresponds to the second height (Yes in S13), the display device 50 displays a predetermined confirmation screen for confirmation of whether or not to start automatic travel, and whether or not to start automatic travel is confirmed (S14). Specifically, the confirmation screen displays, for example, a "Next" button, a "Confirm" button, and/or the like, such a button is operated, and whether or not to start automatic travel is determined.

On the contrary, if the display device 50 determines that the position lever 42g is not in the operation position that corresponds to the second height (No in S13), the display device 50 displays a predetermined prompt screen indicating that the operation position of the position lever 42g needs to be changed and automatic travel cannot be started (S15).

As shown in FIG. 6A, in the case where the display device 50 has displayed a confirmation screen on the display unit 51 (S14) and the operator has performed a predetermined operation such as operating a "Next" button, a "Confirm" button, or the like displayed on the confirmation screen, i.e., the display device 50 has confirmed whether or not to start automatic travel, the display device 50 outputs, to the control device 40 (automatic travel control unit 40a), a command signal indicating that the button has been operated and automatic travel should be started (S16). Upon acquisition of the command signal from the display device 50, the automatic travel control unit 40a starts automatic travel of the working machine 1 (S17) and a transition occurs to an automatic travel phase.

Figure 6B:
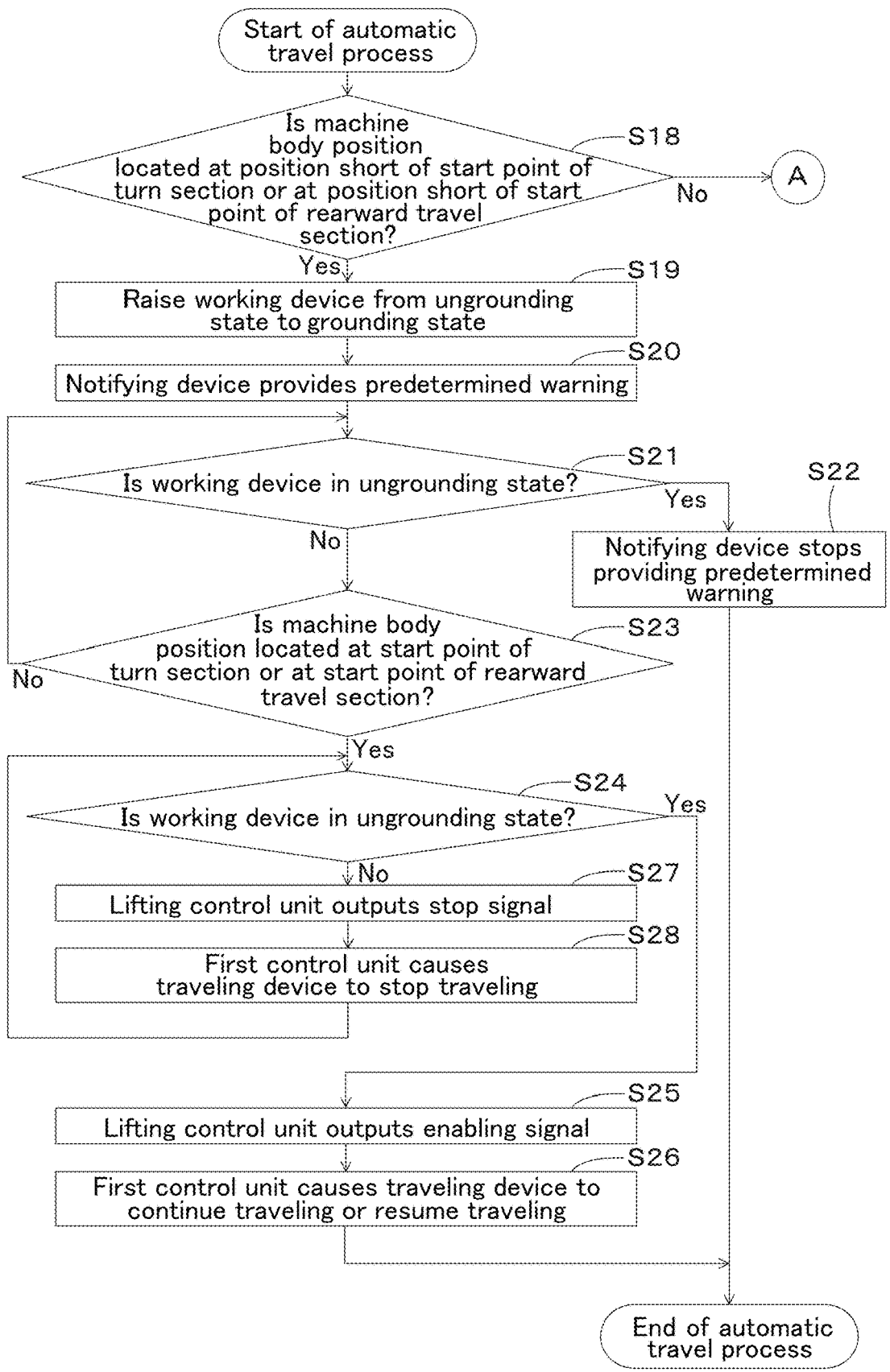
FIG. 6B is a chart showing a flow of control of a lifting device by a lifting control unit.

Once the automatic travel control unit 40a has started automatic travel (S17), as shown in FIG. 6B, the control device 40 determines, based on the machine body position W1 detected by the position detecting device 43 and the planned travel route L stored in the storage device 52, whether or not the machine body position W1 is located at a position short of a start point Lb of a turn section L2 or a position short of a start point La2 of a rearward travel section L1b (S18). If the control device 40 determines that the machine body position W1 is located at a position short of a start point Lb of a turn section L2 or a position short of a start point La2 of a rearward travel section L1b (Yes in S18), the lifting control unit 40a2 controls the lifting device 8 based on the first height corrected by the correcting unit 45 to move up with the working device 2 from the grounding state to the ungrounding state (S19).

As shown in FIG. 6B, when the lifting control unit 40a2 causes the lifting device 8 to move upward (S19), the automatic travel control unit 40a causes the notifying device 46 to provide a predetermined warning (S20). Once the automatic travel control unit 40a has caused the notifying device 46 to provide a predetermined warning (S20), the lifting control unit 40a2 determines whether or not the working device 2 is in the ungrounding state based on the corrected first height and the actual extension amount calculated by the control device 40 (S21). If the lifting control unit 40a2 determines that the working device 2 is in the ungrounding state (Yes in S21), the automatic travel control unit 40a causes the notifying device 46 to stop providing the predetermined warning (S22).

As shown in FIG. 6B, if the lifting control unit 40a2 determines that the working device 2 is in the grounding state (No in S21), the control device 40 determines whether or not the machine body position W1 is located at the start point Lb of the turn section L2 or at the start point La2 of the rearward travel section L1b (S23). If the control device 40 determines that the machine body position W1 is not located at the start point Lb of the turn section L2 or the start point La2 of the rearward travel section L1b (No in S23), the flow returns to S21 and the lifting control unit 40a2 determines whether or not the working device 2 is in the ungrounding state based on the corrected first height and the actual extension amount calculated by the control device 40.

On the contrary, if the control device 40 determines that the machine body position W1 is located at the start point Lb of the turn section L2 or at the start point La2 of the rearward travel section L1b (Yes in S23), as shown in FIG. 6B, the lifting control unit 40a2 determines whether or not the working device 2 is in the ungrounding state based on the corrected first height and the actual extension amount calculated by the control device 40 (S24). If the lifting control unit 40a2 determines that the working device 2 is in the ungrounding state (Yes in S24), the lifting control unit 40a2 outputs an enabling signal to the first control unit 40a1 (S25). Upon acquisition of the enabling signal from the lifting control unit 40a2, the first control unit 40a1 causes the traveling device 7 to continue traveling or resume traveling (S26). In such a case, the automatic travel control unit 40a causes the notifying device 46 to stop providing the predetermined warning.

As shown in FIG. 6B, if the lifting control unit 40a2 determines that the working device 2 is in the grounding state (No in S24), the lifting control unit 40a2 outputs a stop signal to the first control unit 40a1 (S27). Upon acquisition of the stop signal, the first control unit 40a1 causes the traveling device 7 to stop traveling (S28). Once the first control unit 40a1 has caused the traveling device 7 to stop traveling (S28), the flow returns to S24 and the lifting control unit 40a2 determines whether or not the working device 2 is in the ungrounding state based on the corrected first height and the actual extension amount calculated by the control device 40 (S24).

With this, the automatic travel control unit 40a causes the machine body 3 to start turning at the start point Lb of the turn section L2 with the working device 2 raised in the ungrounding state, and causes the machine body 3 to start traveling rearward at the start point La2 of the rearward travel section L1b with the working device 2 raised in the ungrounding state.

Figure 6C:
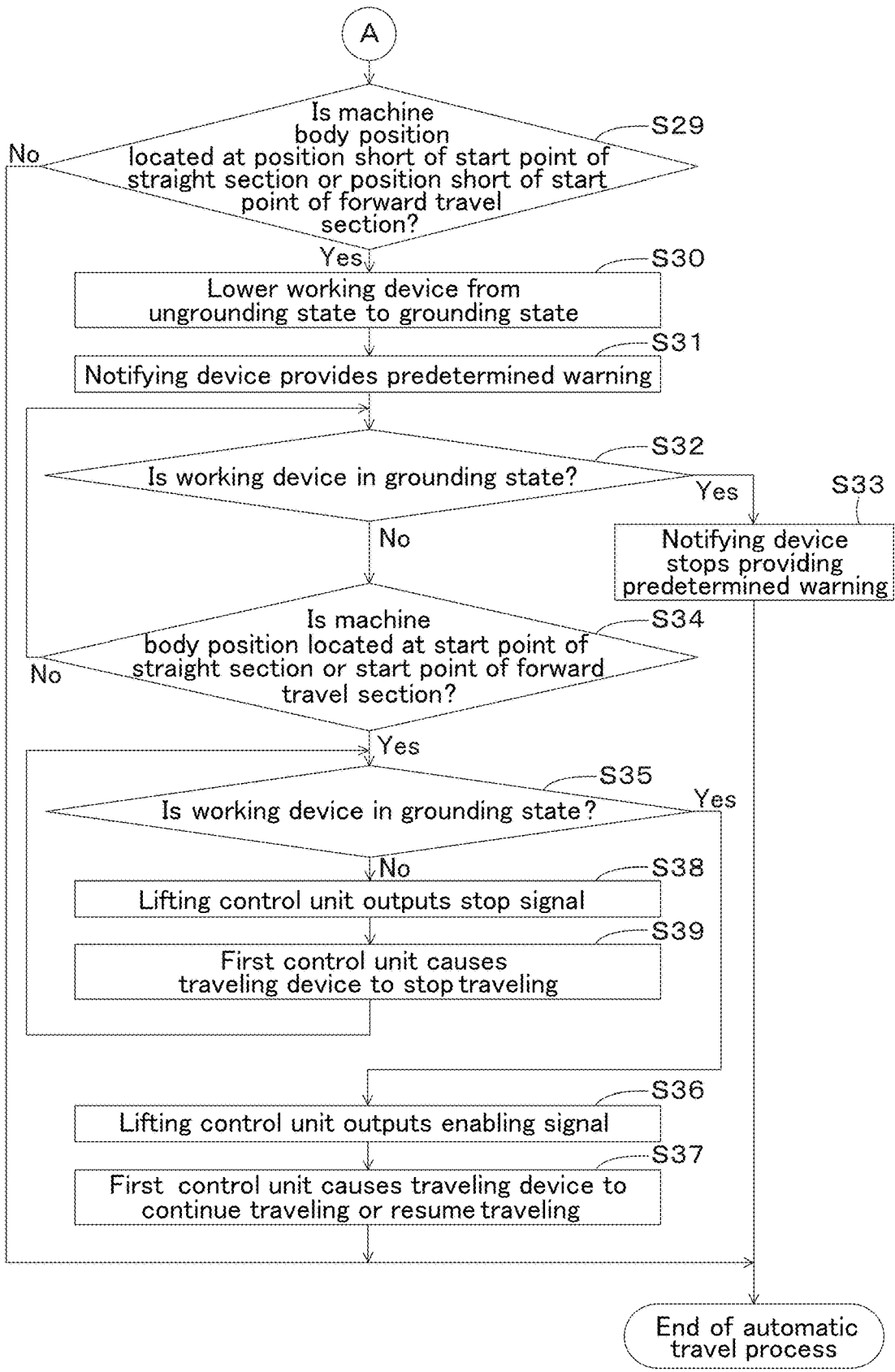
FIG. 6C is a chart showing a flow of control of the lifting device by the lifting control unit.

As shown in FIGS. 6B and 6C, in S18, if the control device 40 determines that the machine body position W1 is not located at the position short of the start point Lb of the turn section L2 or the position short of the start point La2 of the rearward travel section L1b (No in S18), the control device 40 determines, based on the machine body position W1 detected by the position detecting device 43 and the planned travel route L stored in the storage device 52, whether or not the machine body position W1 is located at a position short of a start point La of a straight section L1 or a position short of a start point La1 of a forward travel section L1a (S29).

If the control device 40 determines that the machine body position W1 is located at a position short of a start point La of a straight section L1 or a position short of a start point La1 of a forward travel section L1a (Yes in S29), the lifting control unit 40a2 controls the lifting device 8 based on the second height to move down with the working device 2 from the ungrounding state to the grounding state (S30). When the lifting control unit 40a2 causes the lifting device 8 to move downward (S30), the automatic travel control unit 40a causes the notifying device 46 to provide a predetermined warning (S31). Once the automatic travel control unit 40a has caused the notifying device 46 to provide a predetermined warning (S31), the lifting control unit 40a2 determines whether or not the working device 2 is in the grounding state based on the second height and the actual extension amount calculated by the control device 40 (S32). If the lifting control unit 40a2 determines that the working device 2 is in the grounding state (Yes in S32), the automatic travel control unit 40a causes the notifying device 46 to stop providing the predetermined warning (S33).

As shown in FIG. 6C, if the lifting control unit 40a2 determines that the working device 2 is in the ungrounding state (No in S32), the control device 40 determines whether or not the machine body position W1 is located at a start point La of a straight section L1 or a start point La1 of a forward travel section L1a (S34). If the control device 40 determines that the machine body position W1 is not located at a start point La of a straight section L1 or a start point La1 of a forward travel section L1a (No in S34), the flow returns to S32 and the lifting control unit 40a2 determines whether or not the working device 2 is in the grounding state based on the second height and the actual extension amount calculated by the control device 40 (S32).

On the contrary, as shown in FIG. 6C, if the control device 40 determines that the machine body position W1 is located at a start point La of a straight section L1 or a start point La1 of a forward travel section L1a (Yes in S34), the lifting control unit 40a2 determines whether or not the working device 2 is in the grounding state based on the second height and the actual extension amount calculated by the control device 40 (S35). If the lifting control unit 40a2 determines that the working device 2 is in the grounding state (Yes in S35), the lifting control unit 40a2 outputs an enabling signal to the first control unit 40a1 (S36). Upon acquisition of the enabling signal from the lifting control unit 40a2, the first control unit 40a1 causes the traveling device 7 to continue traveling or resume traveling (S37). In such a case, the automatic travel control unit 40a causes the notifying device 46 to stop providing the predetermined warning.

As shown in FIG. 6C, if the lifting control unit 40a2 determines that the working device 2 is in the ungrounding state (No in S35), the lifting control unit 40a2 outputs a stop signal to the first control unit 40a1 (S38). Upon acquisition of the stop signal, the first control unit 40a1 causes the traveling device 7 to stop traveling (S39). The flow returns to S35, and the lifting control unit 40a2 determines whether or not the working device 2 is in the grounding state based on the second height and the actual extension amount calculated by the control device 40 (S35).

With this, the automatic travel control unit 40a causes the machine body 3 to start traveling straight at the start point La of the straight section L1 with the working device 2 lowered in the grounding state, and causes the machine body 3 to start traveling forward at the start point La1 of the forward travel section L1a with the working device 2 lowered in the grounding state.

A working machine 1 as has been described includes a machine body 3, a lifting device 8 to link a working device 2 to the machine body 3, the lifting device 8 being capable of moving up and down with the working device 2 between a grounding state in which the working device 2 is in contact with a ground and an ungrounding state in which the working device 2 is out of contact with the ground, and an automatic travel controller 40a to cause the machine body 3 to perform automatic travel according to a planned travel route L, wherein the automatic travel controller 40a is configured or programmed to include a lifting controller 40a2 to control the lifting device 8 to move up with the working device 2 from the grounding state to the ungrounding state, and cause the machine body 3 to turn or travel rearward after the lifting control unit 40a2 controls the lifting device 8 to move up with the working device 2 from the grounding state to the ungrounding state. With the configuration, the machine body 3 does not turn or travel rearward when the working device 2 is in the grounding state or while the working device 2 is being moved from the grounding state to the ungrounding state, and the machine body 3 turns or travels rearward with the working device 2 raised in the ungrounding state, i.e., with the working device 2 out of contact with the ground. Thus, it is possible to reliably raise the working device 2 to the ungrounding state when the machine body 3 is to turn or travel rearward.

The working machine 1 further includes an input interface to receive input of a height of the lifting device 8 in the ungrounding state, wherein the lifting controller 40a2s is configured or programmed to control, based on the height received by the input device, the lifting device 8 to move up with the working device 2 from the grounding state to the ungrounding state. With the configuration, it is possible to input any height of the lifting device 8 in the ungrounding state, and possible to change the height depending on the working device 2. Thus, even when the height of the lifting device 8 in the ungrounding state differs depending on the working device 2, it is possible to reliably raise the working device 2 to the ungrounding state when the machine body 3 is to turn or travel rearward.

The input interface includes a display 50 to display an input screen to receive input of the height, the display 50 includes a storage 52 to store information regarding the working device 2 and the height received by the input screen such that the working device 2 and the height are associated with each other, and the lifting controller 40a2 is configured or programmed to acquire, from the storage 52, the height associated with the working device 2. With the configuration, it is possible to input a height corresponding to each working device 2, and possible to reliably restrict the machine body 3 from turning or traveling rearward with the working device 2 in the grounding state.

The working machine 1 further includes a corrector 45 to correct the height received by the input interface based on a predetermined correction value so that the height thus corrected is higher than the height received by the input interface, wherein the lifting controller 40a2 is configured or programmed to control, based on the height corrected by the corrector 45, the lifting device 8 to move up with the working device 2 from the grounding state to the ungrounding state. With the configuration, by upward movement of the lifting device 8 to a position higher than the height received by the input interface, it is possible to prevent or reduce the likelihood that the working device 2 will contact the ground due to the slope of an agricultural field and/or vibration of the working machine 1 when the machine body 3 turns or travels rearward.

The working machine 1 further includes a notifier 46 to, in a case where the automatic travel controller 40a causes the machine body 3 to turn or travel rearward, provide a predetermined warning for a period of time during which the lifting controller 40a2 controls the lifting device 8 to move up with the working device 2 from the grounding state to the ungrounding state. With the configuration, an operator can easily recognize that the working device 2 cannot be lowered from the ungrounding state while the working machine 1 is being caused by the automatic travel controller 40a to turn or travel rearward.

The lifting control unit 40a2 is configured or programmed to control the lifting device 8 to move down with the working device 2 from the ungrounding state to the grounding state, and the automatic travel controller 40a is configured or programmed to cause the machine body 3 having turned to start traveling straight or causes the machine body 3 having traveled rearward to start traveling forward after the lifting controller 40a2 controls the lifting device 8 to move down with the working device 2 from the ungrounding state to the grounding state. With the configuration, it is possible to prevent the machine body 3 having turned from starting traveling straight and prevent the machine body 3 having traveled rearward from starting traveling forward when the working device 2 is in the ungrounding state, and possible to reliably cause the working device 2 to do work.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a machine body;
a lifting device to link a working device to the machine body, the lifting device being capable of moving up and down with the working device between a grounding state in which the working device is in contact with a ground and an ungrounding state in which the working device is out of contact with the ground;
an automatic travel controller to cause the machine body to perform automatic travel according to a planned travel route; and
an input interface to receive input of a first height of the lifting device in the ungrounding state; wherein
the lifting device is operable to have a plurality of working devices, including the working device, attached thereto;
the input interface includes a storage to store information regarding each of the plurality of working devices and the first height, such that each of the plurality of working devices and the first height are associated with each other;
the automatic travel controller is configured or programmed to include a lifting controller to control the lifting device to move up with the working device from the grounding state to the ungrounding state;
the lifting controller is configured or programmed to acquire the first height associated with the working device attached to the lifting device, control the lifting device based on the first height associated with the working device attached to the lifting device to move up with the working device from the grounding state to the ungrounding state, and enable the machine body to turn or travel rearward when the working device is in the ungrounding state; and
the automatic travel controller is configured or programmed to cause the machine body to turn or travel rearward after the lifting controller controls the lifting device to move up with the working device from the grounding state to the ungrounding state.

2. The working machine according to claim 1, wherein the lifting controller is configured or programmed to acquire the first height associated with the working device attached to the lifting device out of the information regarding the first height associated with each of the plurality of working devices stored in the storage, and control, based on the first height associated with the working device attached to the lifting device, the lifting device to move up with the working device from the grounding state to the ungrounding state.

3. The working machine according to claim 2, wherein the input interface includes a display to display an input screen to receive input of the first height;

the display is operable to display a selection screen by which the working device attached to the lifting device is selected and acquire information regarding the working device; and based on the information regarding the working device acquired by the display, the lifting controller is configured or programmed to acquire, from the storage, the first height associated with the working device attached to the lifting device out of the information regarding the first height associated with each of the plurality of working devices stored in the storage.

4. The working machine according to claim 2, further comprising a corrector to correct the first height received by the input interface based on a predetermined correction value so that the first height thus corrected is higher than the first height received by the input interface; wherein the lifting controller is configured or programmed to control, based on the first height corrected by the corrector, the lifting device to move up with the working device from the grounding state to the ungrounding state.

5. The working machine according to claim 1, further comprising a notifier to, in a case where the automatic travel controller causes the machine body to turn or travel rearward, provide a predetermined warning for a period of time during which the lifting controller controls the lifting device to move up with the working device from the grounding state to the ungrounding state.

6. The working machine according to claim 1, wherein the lifting controller is configured or programmed to control the lifting device to move down with the working device from the ungrounding state to the grounding state, and enable the machine body having turned to start traveling straight or enable the machine body to start traveling rearward when the working device is moved down from the ungrounding state to the grounding state so that the working device becomes in the grounding state; and the automatic travel controller is configured or programmed to cause the machine body having turned to start traveling straight or cause the machine body having traveled rearward to start traveling forward after the lifting controller controls the lifting device to move down with the working device from the ungrounding state to the grounding state.

7. The working machine according to claim 1, further comprising a position lever to be manually operated to cause the lifting device to perform raising or lowering; wherein the input interface receives input of a second height of the lifting device in the grounding state in addition to the first height; and the automatic travel controller is configured or programmed to allow the automatic travel to be started if the position lever is in an operation position that corresponds to the second height, and to not start the automatic travel if the position lever is not in the operation position that corresponds to the second height.

* * * * *